(12) United States Patent
Singh

(10) Patent No.: US 11,706,243 B2
(45) Date of Patent: *Jul. 18, 2023

(54) MULTI-APPLICATION RECOMMENDATION ENGINE FOR A REMOTE NETWORK MANAGEMENT PLATFORM

(71) Applicant: ServiceNow, Inc., Santa Clara, CA (US)

(72) Inventor: Manjeet Singh, Milpitas, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/446,019

(22) Filed: Aug. 26, 2021

(65) Prior Publication Data
US 2021/0392156 A1 Dec. 16, 2021

Related U.S. Application Data

(63) Continuation of application No. 16/505,148, filed on Jul. 8, 2019, now Pat. No. 11,115,432.

(51) Int. Cl.
H04L 29/08 (2006.01)
H04L 9/40 (2022.01)
(Continued)

(52) U.S. Cl.
CPC ......... *H04L 63/1433* (2013.01); *G06N 20/00* (2019.01); *H04L 41/16* (2013.01); *H04L 67/02* (2013.01); *H04L 67/10* (2013.01)

(58) Field of Classification Search
CPC .......................... H04L 63/1433; H04L 41/16
See application file for complete search history.

(56) References Cited

U.S. PATENT DOCUMENTS 5,978,594 A 11/1999 Bonnell
6,321,229 B1 11/2001 Goldman
(Continued)

OTHER PUBLICATIONS

Goel, Applying Machine Learning to classify an unsupervised text document, Toward Data Science, https://towardsdatascience.com/applying-machine-learning-to-classify-an-unsupervised-text-document-e7bb6265f52 (last accessed Jul. 1, 2019).
(Continued)

*Primary Examiner* — Adnan M Mirza
(74) *Attorney, Agent, or Firm* — Fletcher Yoder PC

(57) ABSTRACT

A remote network management platform may include persistent storage containing: (i) data related to a managed network, and (ii) a persona of a user. The remote network management platform may also include a platform application associated with a web-based user interface and using a portion of the data. The remote network management platform may also include a recommendation engine with access to a set of rules or a machine learning (ML) model corresponding to the platform application. The recommendation engine may be configured to: (i) read, from the persistent storage, the portion of the data and the persona; (ii) apply, to the portion of the data and the persona, the set of rules or the ML model to generate one or more recommendations; and (iii) transmit, by way of the web-based user interface and to the user, representations of the one or more recommendations.

20 Claims, 16 Drawing Sheets

(51) Int. Cl.
  *G06N 20/00* (2019.01)
  *H04L 41/16* (2022.01)
  *H04L 67/10* (2022.01)
  *H04L 67/02* (2022.01)

(56) References Cited

U.S. PATENT DOCUMENTS

| | | |
|---|---|---|
| 6,609,122 B1 | 8/2003 | Ensor |
| 6,799,189 B2 | 9/2004 | Huxoll |
| 6,816,898 B1 | 11/2004 | Scarpelli |
| 6,895,586 B1 | 5/2005 | Brasher |
| 7,020,706 B2 | 3/2006 | Cates |
| 7,027,411 B1 | 4/2006 | Pulsipher |
| 7,028,301 B2 | 4/2006 | Ding |
| 7,062,683 B2 | 6/2006 | Warpenburg |
| 7,131,037 B1 | 10/2006 | LeFaive |
| 7,170,864 B2 | 1/2007 | Matharu |
| 7,219,085 B2 | 5/2007 | Buck et al. |
| 7,350,209 B2 | 3/2008 | Shum |
| 7,392,300 B2 | 6/2008 | Anantharangachar |
| 7,610,512 B2 | 10/2009 | Gerber |
| 7,617,073 B2 | 11/2009 | Trinon |
| 7,685,167 B2 | 3/2010 | Mueller |
| 7,689,628 B2 | 3/2010 | Garg |
| 7,716,353 B2 | 5/2010 | Golovinsky |
| 7,716,592 B2 | 5/2010 | Tien et al. |
| 7,769,718 B2 | 8/2010 | Murley |
| 7,783,744 B2 | 8/2010 | Garg |
| 7,877,783 B1 | 1/2011 | Cline |
| 7,890,802 B2 | 2/2011 | Gerber |
| 7,925,981 B2 | 4/2011 | Pourheidari |
| 7,930,396 B2 | 4/2011 | Trinon |
| 7,941,506 B2 | 5/2011 | Bonal |
| 7,945,860 B2 | 5/2011 | Vambenepe |
| 7,966,398 B2 | 6/2011 | Wiles |
| 8,051,164 B2 | 11/2011 | Peuter |
| 8,082,222 B2 | 12/2011 | Rangarajan |
| 8,151,261 B2 | 4/2012 | Sirota |
| 8,200,527 B1 | 6/2012 | Thompson et al. |
| 8,224,683 B2 | 7/2012 | Manos |
| 8,266,096 B2 | 9/2012 | Navarrete |
| 8,346,752 B2 | 1/2013 | Sirota |
| 8,380,645 B2 | 2/2013 | Kowalski |
| 8,402,127 B2 | 3/2013 | Solin |
| 8,457,928 B2 | 6/2013 | Dang |
| 8,478,569 B2 | 7/2013 | Scarpelli |
| 8,554,750 B2 | 10/2013 | Rangaranjan |
| 8,646,093 B2 | 2/2014 | Myers |
| 8,674,992 B2 | 3/2014 | Poston |
| 8,683,032 B2 | 3/2014 | Spinelli |
| 8,689,241 B2 | 4/2014 | Naik |
| 8,743,121 B2 | 6/2014 | De Peuter |
| 8,745,040 B2 | 6/2014 | Kowalski |
| 8,812,539 B2 | 8/2014 | Milousheff |
| 8,818,994 B2 | 8/2014 | Kowalski |
| 8,832,652 B2 | 9/2014 | Meuller |
| 8,887,133 B2 | 11/2014 | Behnia |
| 8,907,988 B2 | 12/2014 | Poston |
| 9,015,188 B2 | 4/2015 | Behne |
| 9,037,536 B2 | 5/2015 | Vos |
| 9,065,783 B2 | 6/2015 | Ding |
| 9,098,322 B2 | 8/2015 | Apte |
| 9,122,552 B2 | 9/2015 | Whitney |
| 9,137,115 B2 | 9/2015 | Mayfield |
| 9,239,857 B2 | 1/2016 | Trinon |
| 9,261,372 B2 | 2/2016 | Cline |
| 9,317,327 B2 | 4/2016 | Apte |
| 9,323,801 B2 | 4/2016 | Morozov |
| 9,363,252 B2 | 6/2016 | Mueller |
| 9,396,483 B2 | 7/2016 | Hamedi |
| 9,412,084 B2 | 9/2016 | Kowalski |
| 9,467,344 B2 | 10/2016 | Gere |
| 9,535,737 B2 | 1/2017 | Joy |
| 9,534,903 B2 | 4/2017 | Cline |
| 9,613,070 B2 | 4/2017 | Kumar |
| 9,631,934 B2 | 4/2017 | Cline |
| 9,645,833 B2 | 5/2017 | Mueller |
| 9,654,473 B2 | 5/2017 | Miller |
| 9,659,051 B2 | 5/2017 | Hutchins |
| 9,792,387 B2 | 10/2017 | George |
| 9,819,729 B2 | 11/2017 | Moon |
| 9,852,165 B2 | 12/2017 | Morozov |
| 9,967,162 B2 | 5/2018 | Spinelli |
| 10,002,203 B2 | 6/2018 | George |
| 10,270,644 B1 * | 4/2019 | Valsecchi ............ H04L 41/0681 |
| 2008/0082968 A1 | 4/2008 | Chang et al. |
| 2021/0226867 A1 * | 7/2021 | Ovadia ................. H04L 43/065 |

OTHER PUBLICATIONS

Mikolov, et al., Efficient Estimation of Word Representations in Vector Space, https://arxiv.org/pdf/1301.3781.pdf (last accessed Jul. 1, 2019).

Dai, et al., Document Embedding with Paragraph Vectors, https://arxiv.org/pdf/1507.07998.pdf (last accessed Jul. 1, 2019).

* cited by examiner

MULTI-APPLICATION RECOMMENDATION ENGINE FOR A REMOTE NETWORK MANAGEMENT PLATFORM

CROSS REFERENCE TO RELATED APPLICATIONS

This application is a continuation of U.S. patent application Ser. No. 16/505,148, entitled "MULTI-APPLICATION RECOMMENDATION ENGINE FOR A REMOTE NETWORK MANAGEMENT PLATFORM," filed Jul. 8, 2019, which is hereby incorporated by reference in its entirety for all purposes.

BACKGROUND

Remote network management platforms provide web-based and other interfaces with which an enterprise can manage its own networks, computing devices, and the software thereon. For instance, some remote network management platforms can probe these networks and devices to discover the configurations thereof, and store the resulting data as configuration items in a database. From these configuration items, the remote network management platform may be able to generate visual maps of application services provided by the enterprise network (e.g., web services and email services), identify configuration problems, and proactively warn the enterprise about potential security issues.

As the use of remote network management platforms has grown, so has the extent of applications provided by these platforms. Example platform applications include those directed to information technology service management (ITSM), information technology operations management (ITOM), customer service management (CSM), and security operations (SECOPS). But these platform applications often exhibit a lack of persona-based insight, a lack of in-application best practices, little support for continual improvement of how they are used, and no proactive or prescriptive observations or suggestions.

SUMMARY

The embodiments herein provide a platform-based, generic framework for improving the usefulness of platform applications such as ITSM, ITOM, CSM, and SECOPS. This framework may be implemented as a recommendation engine layer in a remote network management platform that includes rule-based logic and machine learning models. This logic and these models may be used to evaluate the operation and performance of the platform applications (e.g., by mining data in the appropriate database or databases), and to recommend "best practices" or make other contextual suggestions that are prescriptive, preventative, and/or corrective. For example, the recommendation engine can evaluate various key performance indicators (KPIs) related to a platform application and make recommendations in a persona-based fashion in an effort to improve that application's KPIs.

Doing so allows enterprises to engage in automated improvement of their services and operations. By making the recommendation engine generic and usable across some or all major platform applications, there is no need to build such a recommendation engine into each individual platform application. Further, the interface, configuration, and procedures used by the recommendation engine can be common across platform applications, thus easing integration and increasing familiarity for users. Additional advantages include enabling the enterprise to make better use of its existing software features, expediting onboarding of new platform applications, providing insights in to platform application performance tailored to various user personae, employing per-application best practices, and supporting continuous improvement of processes and services.

Accordingly, a first example embodiment may involve a remote network management platform comprising: one or more processors, persistent storage, a platform application, and a recommendation engine. The persistent storage may contain: (i) data related to a managed network, and (ii) a persona of a user, where the persona defines a role of the user in context of the managed network. The platform application may be executable by the one or more processors, associated with a web-based user interface, and may use a portion of the data. The recommendation engine may be executable by the one or more processors with access to a set of rules or a machine learning (ML) model corresponding to the platform application, where the set of rules and the ML model are configured to provide recommendations for the user based on the portion of the data and the persona, and where the recommendation engine is configured to: (i) read, from the persistent storage, the portion of the data and the persona; (ii) apply, to the portion of the data and the persona, the set of rules or the ML model to generate one or more recommendations, where the one or more recommendations are related to the platform application and operation of the managed network; and (iii) provide, by way of the web-based user interface and to the user, representations of the one or more recommendations.

A second example embodiment may involve reading, by a recommendation engine of a remote network management platform and from persistent storage, a portion of data and a persona, where the data is related to a managed network, where the persona defines a role of a user in context of the managed network, and where the remote network management platform hosts and provides a platform application associated with a web-based user interface and using a portion of the data. The second example embodiment may also involve applying, by the recommendation engine to the portion of the data and the persona, a set of rules or an ML model to generate one or more recommendations for the user, where the one or more recommendations are related to the platform application and operation of the managed network. The second example embodiment may also involve transmitting, by way of the web-based user interface and to the user, representations of the one or more recommendations.

In a third example embodiment, an article of manufacture may include a non-transitory computer-readable medium, having stored thereon program instructions that, upon execution by a computing system, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first and/or second example embodiment.

In a fifth example embodiment, a system may include various means for carrying out each of the operations of the first and/or second example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
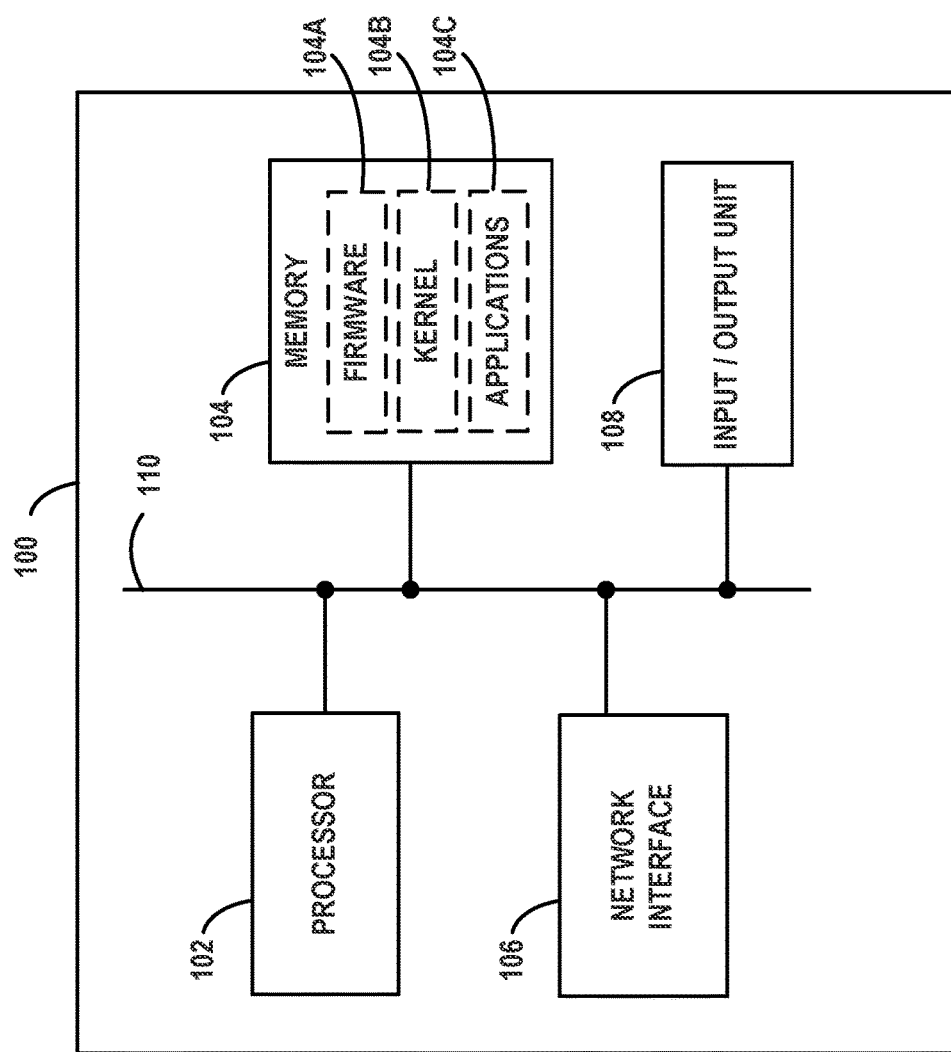
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
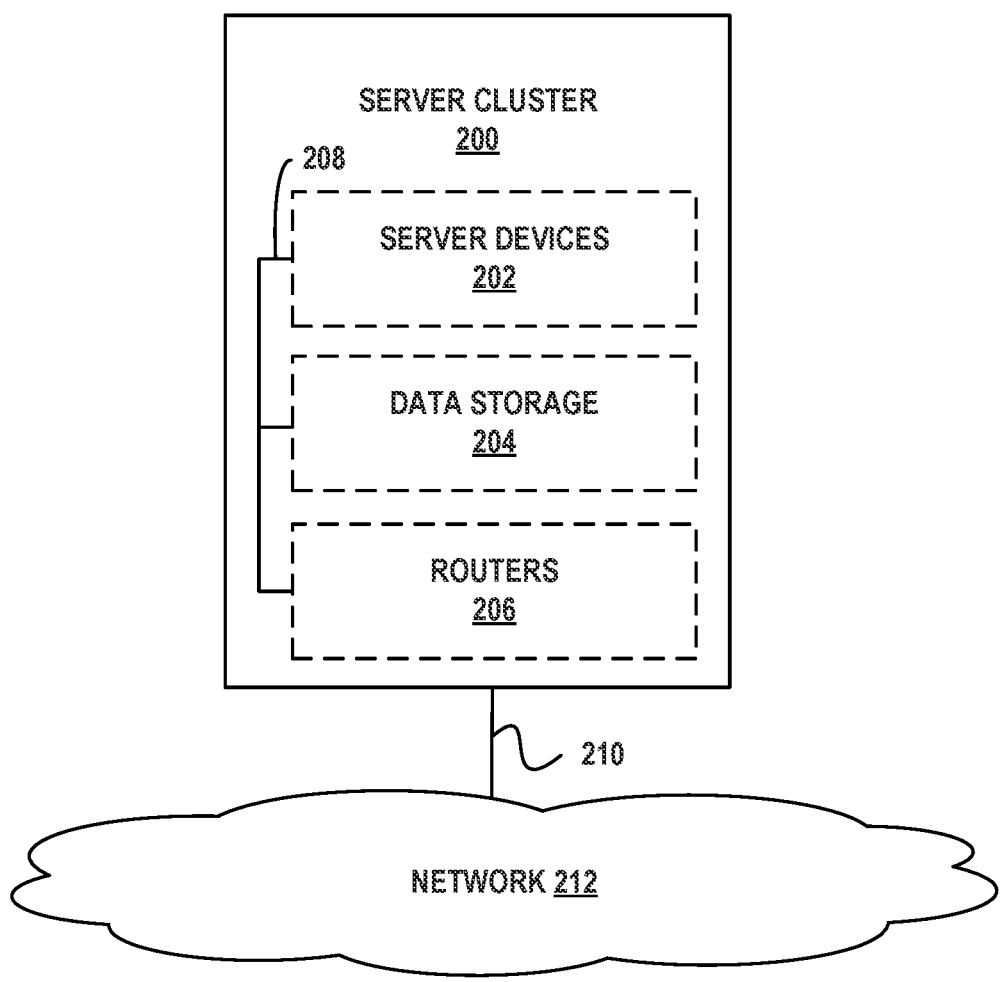
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between the server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PUP), Active Server Pages (ASP), JAVASCRIPT®, and so on. Computer program code written in these languages may facilitate the providing of web pages to client devices, as well as client device interaction with the web pages.

III. Example Remote Network Management Architecture

Figure 3:
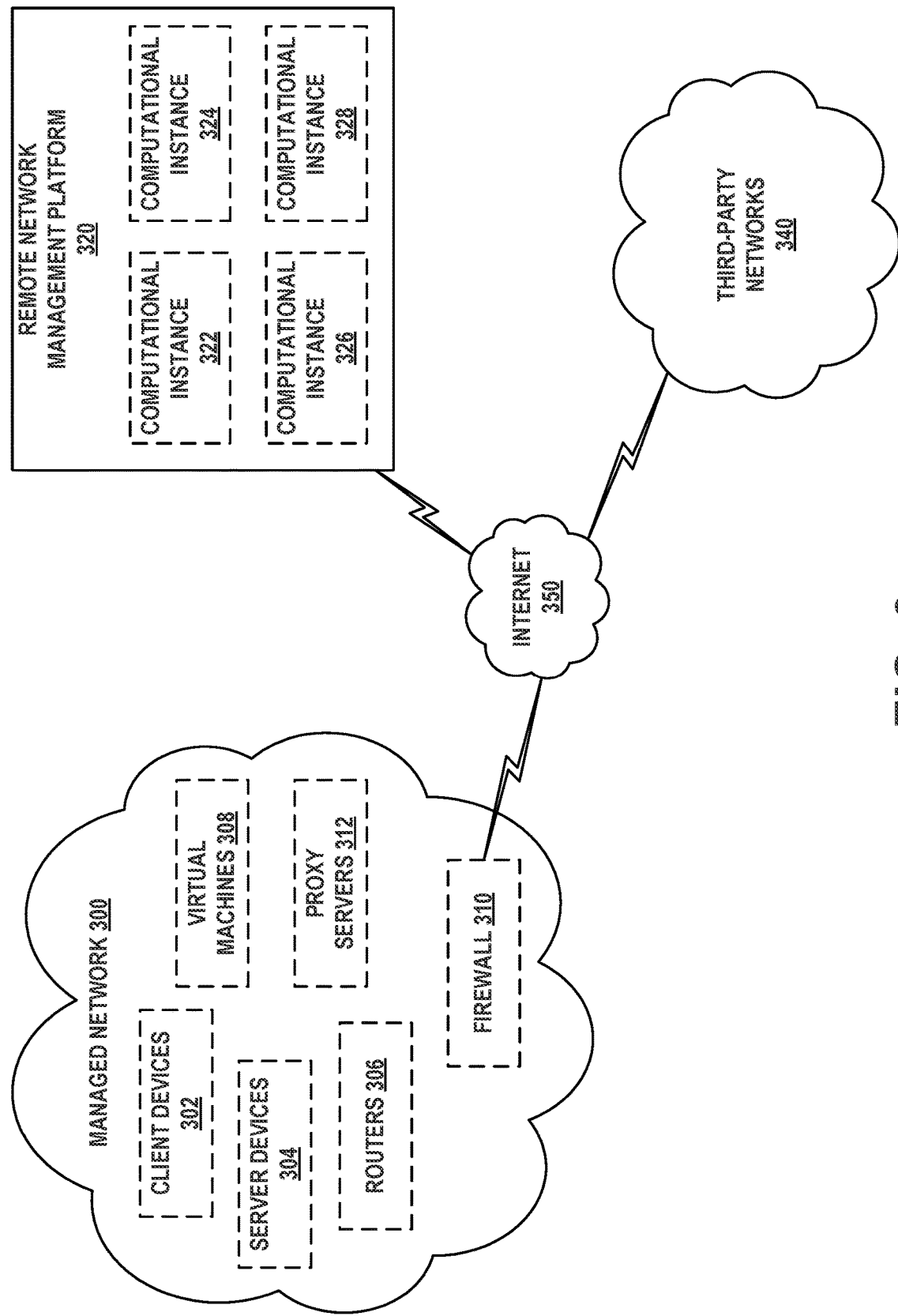
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent one or more server devices and/or one or more databases that provide a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows with one or more database tables).

For purpose of clarity, the disclosure herein refers to the physical hardware, software, and arrangement thereof as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of physical or virtual servers and database devices. Such a central instance may serve as a repository for data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® AZURE®. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
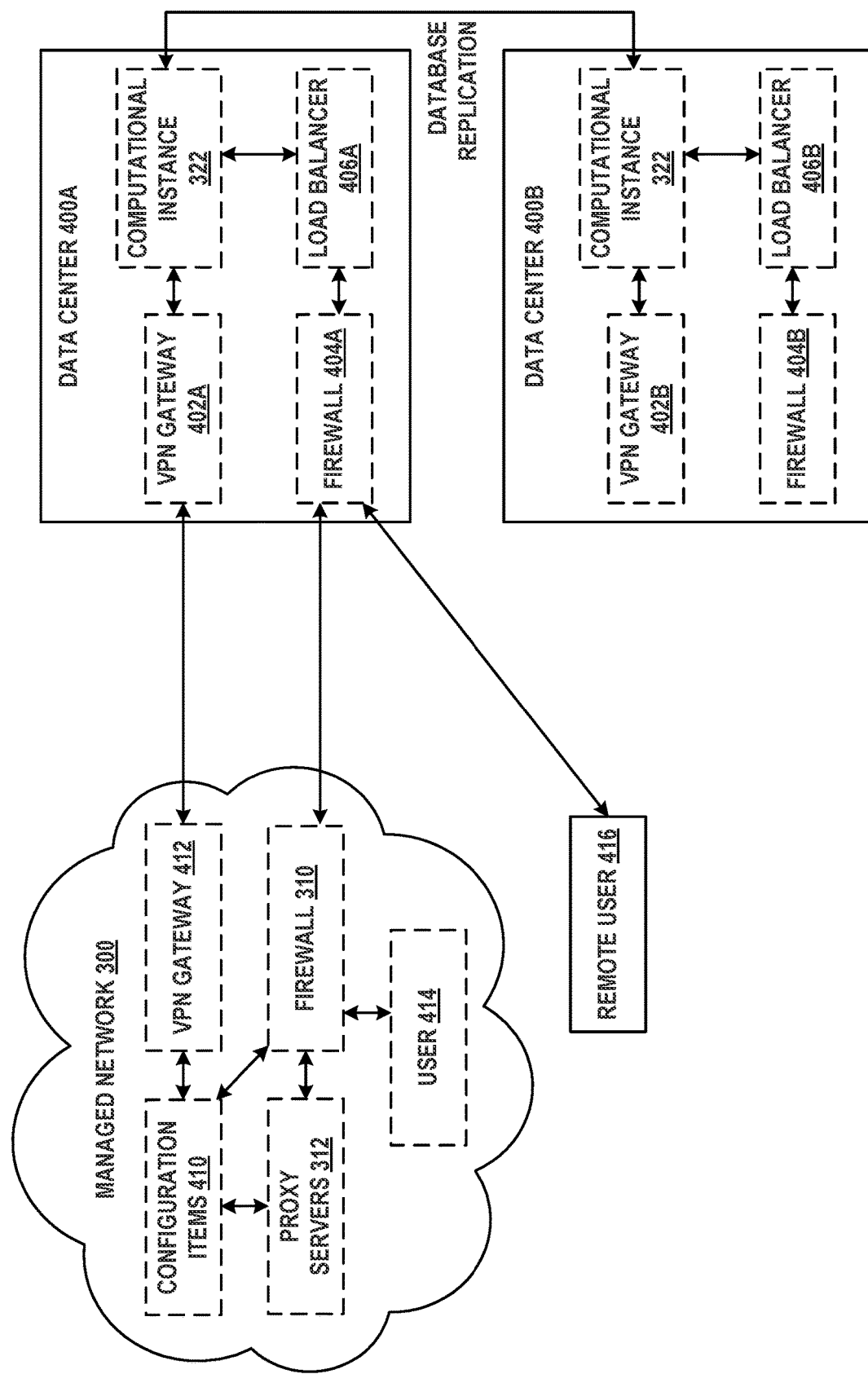
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
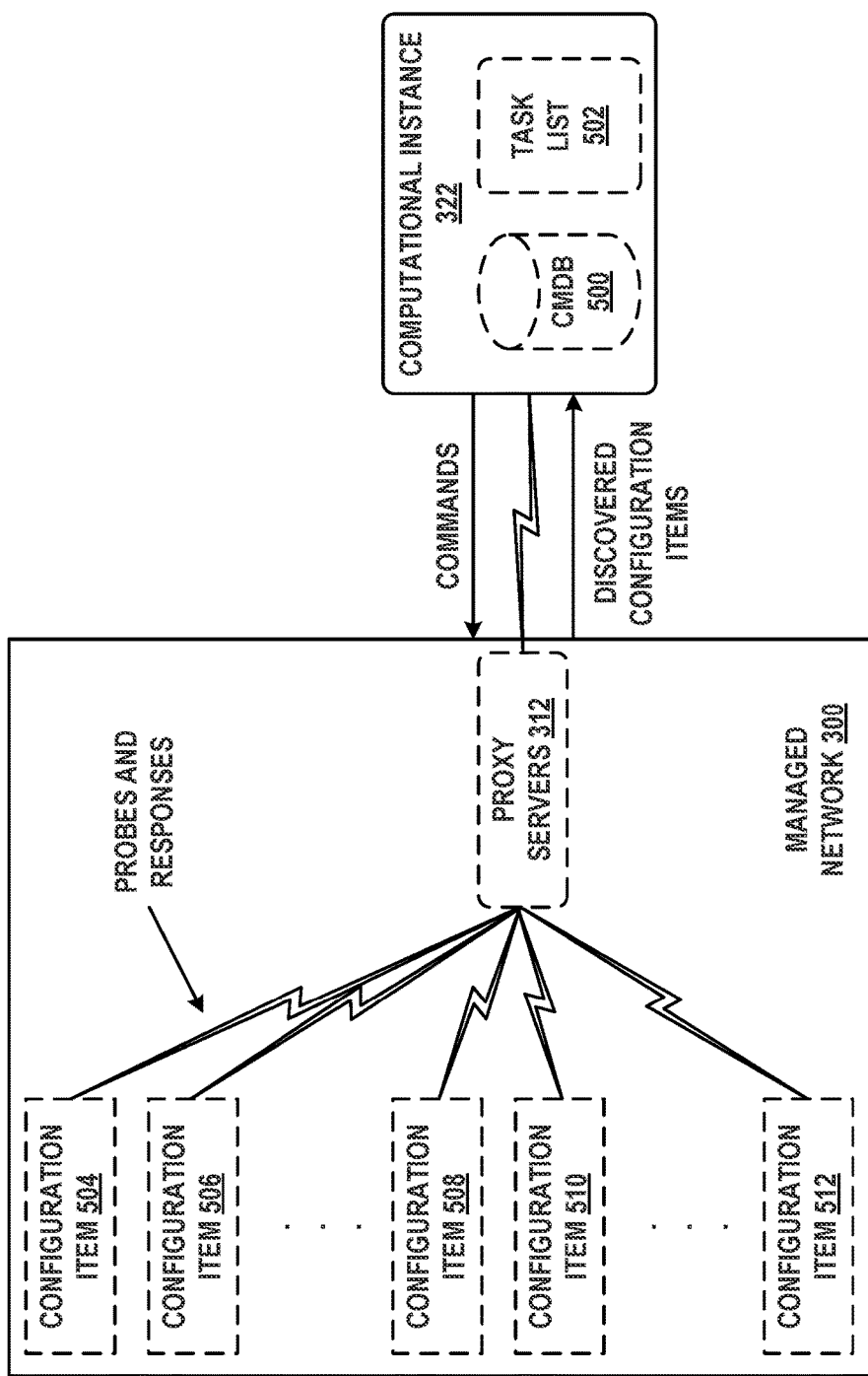
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
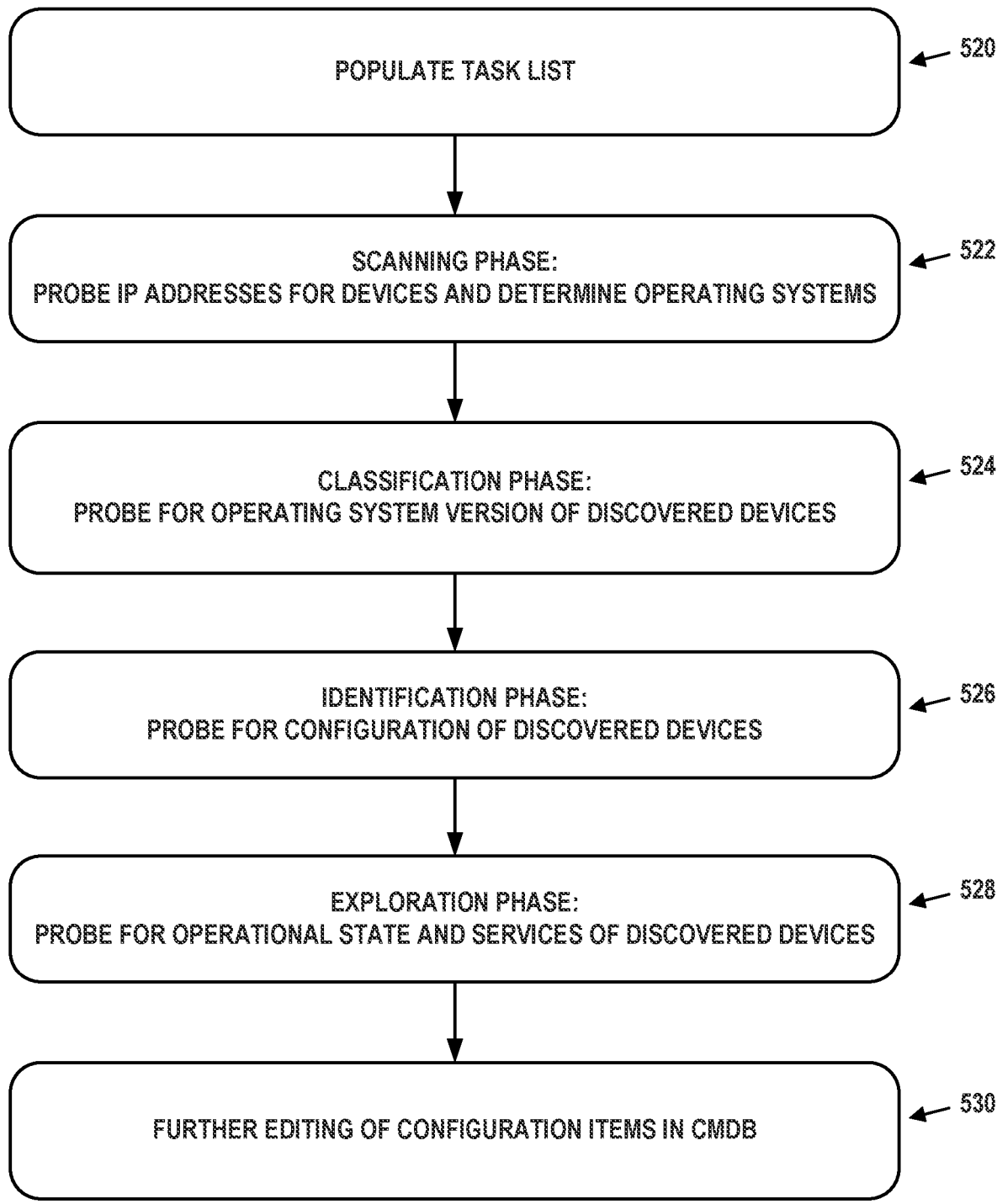
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. Example Platform Applications

Herein, the term "platform application" shall refer to a software application that largely executes on and/or is controlled by a remote network management platform. Thus, platform applications may store and access data from a CMDB or other database, and may provide web-based or other interfaces through which they can be used. This is in contrast to software applications deployed on a managed network, which shall be referred to as "applications" or "enterprise applications" herein.

Platform applications include, but are not limited to those providing information technology service management (ITSM), information technology operations management (ITOM), customer service management (CSM), and security operations (SECOPS). Each of these types of applications is described further below. Additionally, each of these platform applications may be a suite of applications working independently or together to provide the prescribed functionality. Nonetheless, various other platform applications are possible.

ITSM refers to applications, services, procedures, and policies that deliver IT services to an enterprise. ITSM is generally user-focused and aims to achieve continuation improvement of processes. Some ITSM functions include incident (trouble ticket) management, problem (root cause) management, change and release (software installation and upgrade) management, and request (e.g., procurement) management. Underlying technologies that facilitate ITSM include knowledgebases, virtual agents, performance analytics, benchmarks, surveys, and so on.

ITOM refers to administration of networks, computing devices, infrastructure, enterprise applications, services, and connectivity therebetween. The aforementioned discovery procedures fall within ITOM, as do service mapping (generation of maps of related applications to visualize the services they provide), orchestration and automation of IT processes and workflows, and cloud management (discovery, service mapping, and management of cloud-based resources). ITOM is often centered around populating a CMDB with accurate information, keeping this information up to date, and using the information to help provide, debug, and otherwise manage services CSM involves software that helps an enterprise provide customer service to its own customers. This may take the form of self-service, live human agents, virtual agents, or walk-up kiosks. CSM routes incoming calls, chat requests, email requests, and/or web-based requests to appropriate agents. Underlying technologies that facilitate CSM include case management tools, knowledgebases, performance analytics, benchmarks, surveys, and so on.

SECOPS include security incident response procedures, vulnerability detection, information security, and threat intelligence, for example. SECOPS platform applications allow faster responses to security threats and proactive identification of vulnerabilities often before those vulnerabilities can be exploited. SECOPS tools rely on accurate CMDB information as well as up-to-date threat databases (which may be obtained from third parties).

While ITSM, ITOM, CSM, SECOPS, and possibly other platform applications may be represented as siloed-off suites of software, this is often not the case. For example, SECOPS teams may work with ITSM and ITOM teams to address security problems. Notably, ITOM and SECOPS platform applications may both rely on and use configuration item data in the CMDB to automate procedures.

Figure 6A:
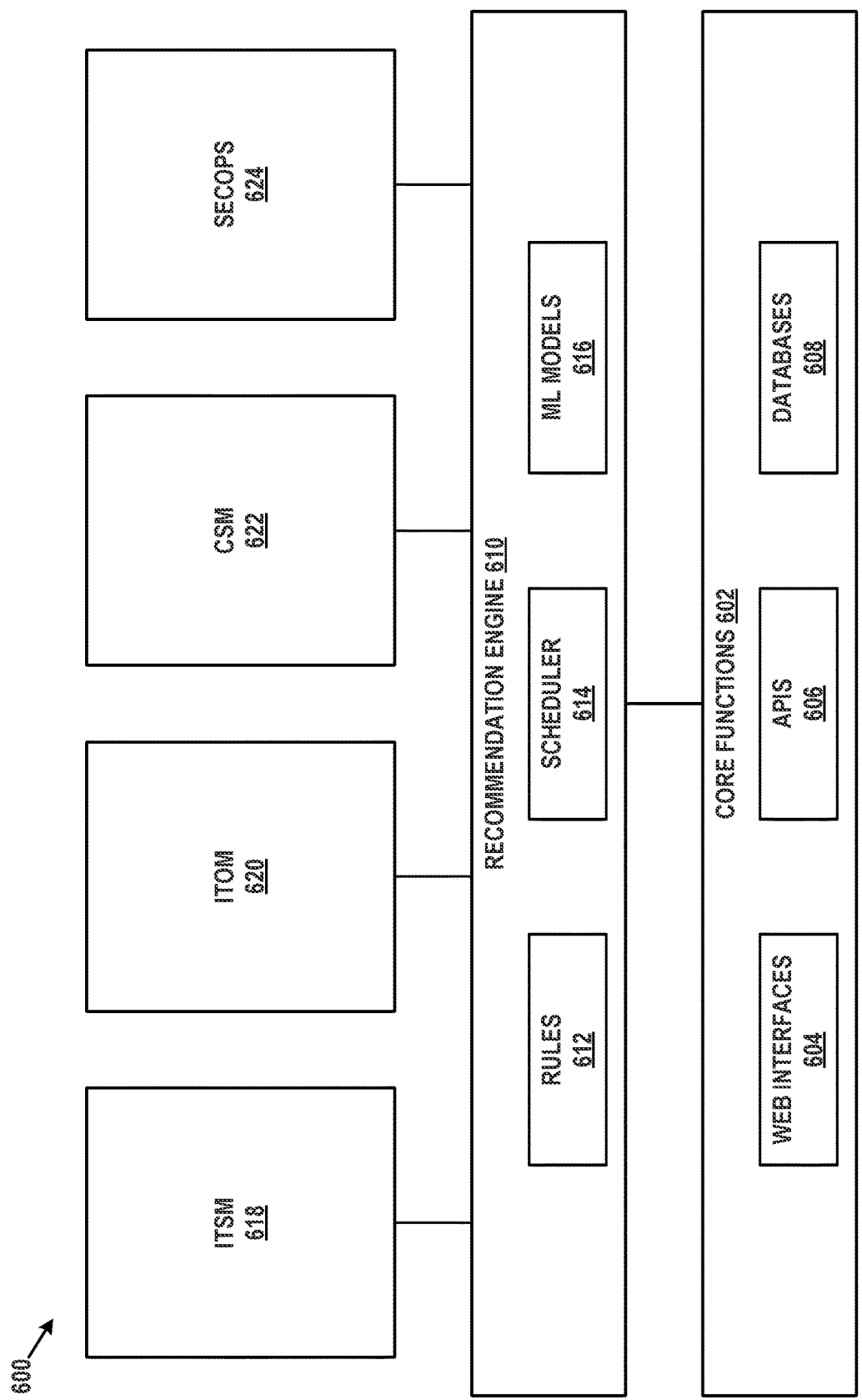
FIG. 6A depicts a computational instance of a remote network management platform with an integrated recommendation engine, in accordance with example embodiments.

VI. Recommendation Engine Integration into a Remote Network Management Platform FIG. 6A depicts architecture 600 of a computational instance of a remote network management platform with an integrated recommendation engine. Thus, architecture 600 may represent computational instance 322 of remote network management platform 320, for example.

Architecture 600 is a logical arrangement that includes core functions 602, recommendation engine 610, and four platform applications—ITSM 618, ITOM 620, CSM 622, and SECOPS 624. But architecture 600 is just a simplified representation, and this arrangement may contain additional components and/or different components in various embodiments.

Core functions 602 include web interfaces 604, APIs 606, and databases 608. In general, core functions may supply features, services, and/or library modules that facilitate operation of a computational instance. Web interfaces 604 may provide one or more customizable web pages and/or web applications through which the computational instance may present information to a user. Web interfaces 604 may also receive input from a user (e.g., configuration changes, data for storage in databases 608) that can change the operation or content of the computational instance. APIs 606 may be a set of well-defined interfaces through which the computational instance can be queried, and also through which input can be provided. For example, APIs 606 may be representational state transfer (REST) APIs that are accessed by way of the hypertext transfer protocol (HTTP). Databases 608 may include a CMDB (e.g., CMDB 500) as well as any database including incident, problem, security, performance, case, or issue information. Further, databases 608 may include structured (e.g., XML or JavaScript Object Notation (JSON) or unstructured (e.g., raw data) files containing relevant information.

Recommendation engine 610 includes rules 612, scheduler 614, and machine learning (ML) models 616. Recommendation engine 610 may include any other data or logic that facilitates making a contextual recommendation for any of the platform applications. Rules 612 include human-determined and/or machine-determined rules for making recommendations to particular user personae. For example, a rule may define that when the value of a particular property passes a threshold, then a recommendation to take an action should be provided to an ITOM administrator. Scheduler 614 schedules when rules 612 and/or ML models 616 are updated, as well as when at least some recommendations are provided. ML models 616 may have been trained using information from databases 608, and provide recommendations based on patterns found in the training data. ML models 616 may be based on neural networks, decision trees, support vector machines, k-means or DBSCAN clustering, Bayesian systems, and so on.

The platform applications, ITSM 618, ITOM 620, CSM 622, and SECOPS 624, may be accessible by way of or use web interfaces 604 and APIs 606, and may use information in databases 608. The platform applications may access core functions 602 directly or indirectly by way of recommendation engine 610. The platform applications may also communicate with recommendation engine 610 to, for example, receive recommendations or change the interaction between a platform application and recommendation engine 610.

In some embodiments, recommendation engine 616, rules 612, and/or ML models 616 may be obtained by way of an "app store" provided by the remote network management platform. Thus, these features may be purchased and deployed as add-ons or plug-ins to computational instances on an enterprise-by-enterprise fashion. Further, deployed versions of recommendation engine 610, rules 612, and/or ML models 616 may be periodically updated with new releases and patches from the app store.

Figure 6B:
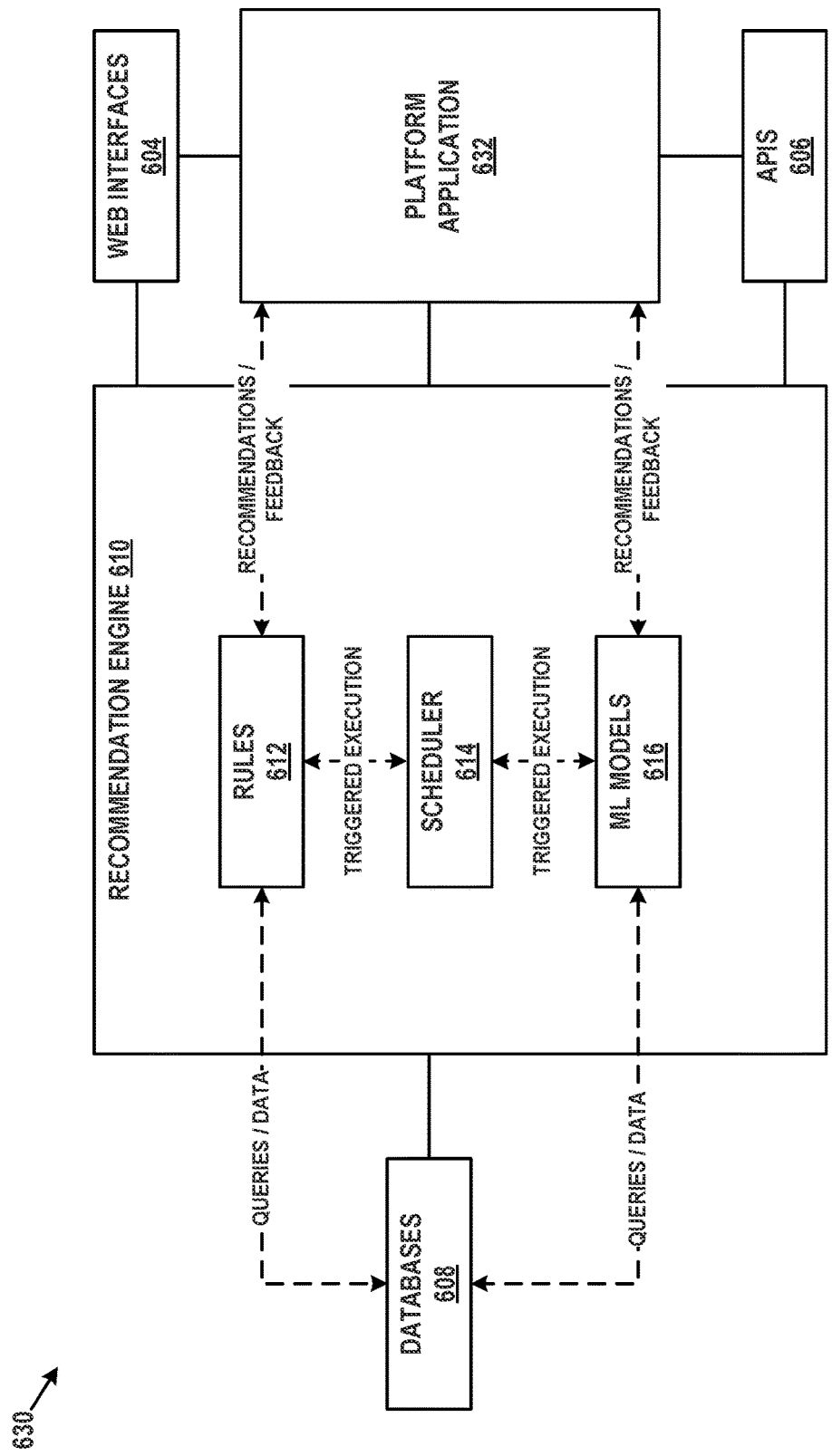
FIG. 6B depicts a functional representation of the recommendation engine, in accordance with example embodiments.

FIG. 6B presents a functional representation 630 of architecture 600. In FIG. 6B, recommendation engine 610 is connected to and is capable of interacting with web interfaces 604, APIs 606, databases 608, and platform application 632. Platform application 632 may be any of ITSM 618, ITOM 620, CSM 622, or SECOPS 624, for example.

Particularly, scheduler 614 may trigger execution of rules 612 and/or ML models 616 on a periodic (e.g., once per day) or aperiodic basis (e.g., upon user request). Execution of rules 612 may cause rules 612 to be applied to data in one or more tables within databases 608. Accordingly, rules 612 may query databases 608 and obtain data therefrom. Execution of ML models 616 may cause ML models to be applied to data in one or more tables within databases 608. In some cases, scheduler 614 may cause ML models 616 to be updated or regenerated based on such data. In any event, ML models 616 may also query databases 608 and obtain data therefrom.

Based on applying rules 612 or ML models 616 to this data, one or recommendations may be made to one or more users by way of platform application 632. In some cases, the user may provide feedback to recommendation engine (e.g., accepting or declining the recommendation, evaluating the recommendation's relevancy, or evaluating the user's interest level in the recommendation. This feedback may be stored in databases 608, and it may be used to further refine how recommendation engine 610 makes recommendations in the future.

Figure 6C:
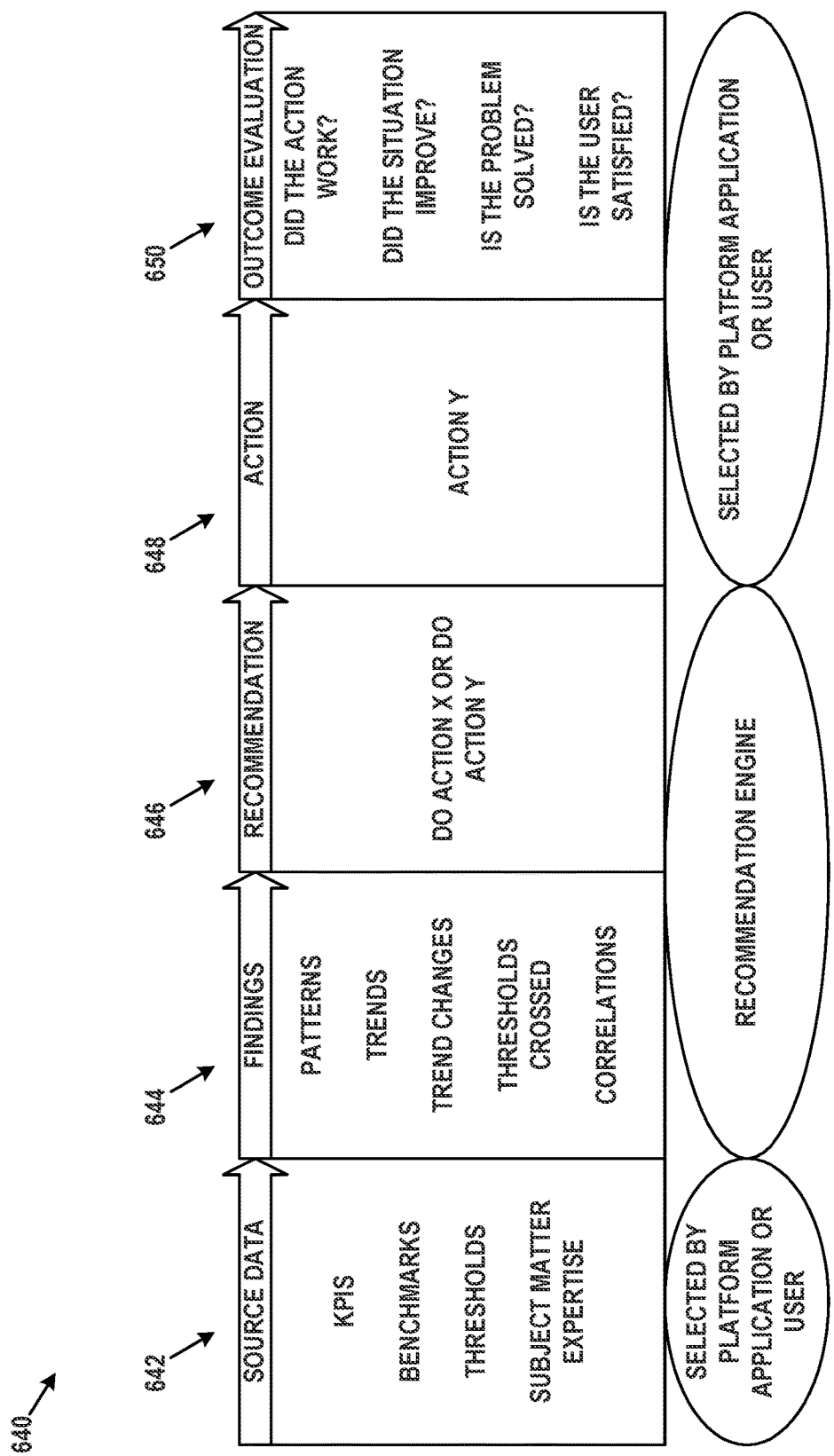
FIG. 6C depicts a workflow of activities carried out by the recommendation engine and a platform application, in accordance with example embodiments.

To further illustrate these concepts, FIG. 6C depicts workflow 640. This workflow is intended to be an example, and other workflows may be used instead.

Workflow 640 proceeds generally from left to right, starting at source data 642. This source data may be stored in databases 608, and may include KPIs, benchmarks, thresholds, and representations of subject matter expertise, for example. Source data 642 may be selected by the relevant platform application with which source data 642 is to be used, or by a user. in some cases, source data 642 may be specified as one or more particular columns in database tables.

Findings 644 are the raw output or observations made when rules 612 or ML model 616 of recommendation engine 610 are applied to source data 642. As shown, these include identification of patterns, trends, trend changes, thresholds being crossed, and/or correlations in source data 642. Other types of findings can be made.

Recommendation 646 may include one or more recommended actions for the user. As shown, this may include doing one or more of specific actions X or Y. The recommended actions may be determined based on findings 644. For example, if findings 644 determines that a device is misconfigured, recommendation 646 may refer the user to a knowledgebase article that explains how the device should be properly configured.

Action 648 may represent an action taken by the platform application or by the user. Action 648 may be taken as a result of recommendation 646 (e.g., action Y), and it is typically taken with the expectation that it will address at least some aspect of any problems identified by findings 644.

Outcome evaluation 650 may represent a follow-up procedure that attempts to determine the impact of action 648. For example, this may involve a user answering one or more questions or filling out a survey about the efficacy of the recommendation. As shown, the user may be asked whether the action has worked, the situation has improved, the problem has been solved, and/or the user is satisfied. The result of outcome evaluation may 650 be feedback with which rules 612 are updated and/or ML model 616 can be re-trained.

In some cases, outcome evaluation 650 can occur without explicit user feedback. For example, suppose that findings 644 determines from KPIs in source data 642 that disk storage in a device is above a pre-determined threshold (e.g., 90%), and recommendation 646 is to delete unneeded files on the device. After this action is taken, the KPIs may revert to being below the threshold. This situation may automatically be detected by the recommendation engine and outcome evaluation 650 may indicate that the recommendation made was relevant to solving the problem.

Figure 6D:
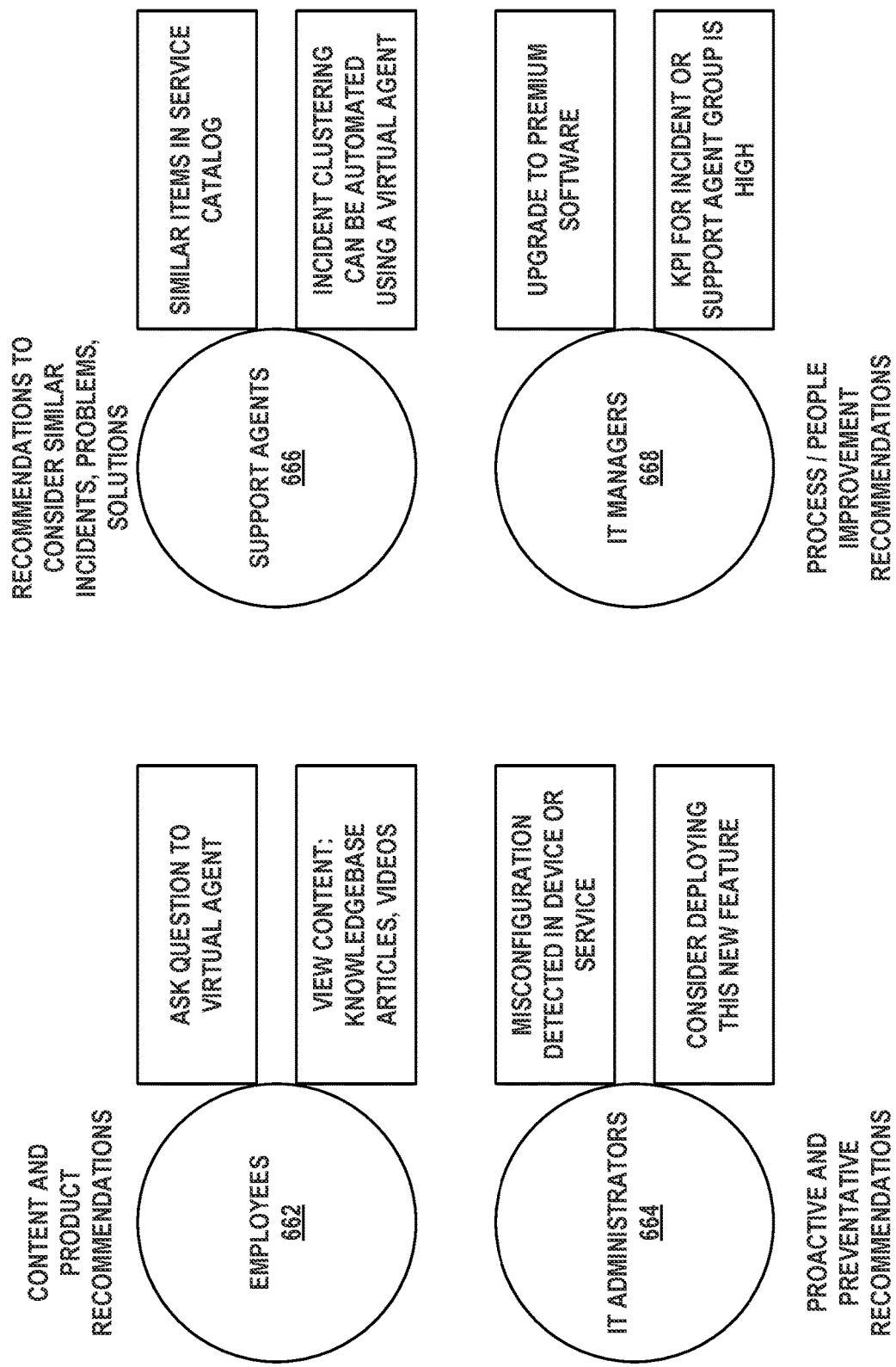
FIG. 6D depicts a set of user personae along with types of recommendations relevant to each, in accordance with example embodiments.

FIG. 6D provides examples persona-based recommendations 660. A persona in this context is a type of user in the enterprise. Each persona may have different abilities, concerns, goals, and roles. Thus, it may be helpful for the recommendation engine to take persona into account when making recommendations (e.g., at 646). FIG. 6D assumes that ITSM is the platform application, but the framework illustrated by this figure can be reused across and/or adapted to other platform applications.

The remote network management platform may provide each persona in FIG. 6D with a contextualized web-page workspace (e.g., a web app or set of web pages) for each platform application. This workspace may have a panel or widget that displays recommendations. For example, the recommendations may appear in a column at the top left of the user's workspace, and may contain one or more recommendations as well as a visual notification (e.g., a red exclamation point or circle) indicating new or unread recommendations for the user.

Employees 662 may be rank-and-file IT users of the enterprise. Thus, employees 662 generally require IT systems to be operational and working according to expectations. The recommendation engine may focus on making content and product recommendation to employees 662. For example, the recommendation engine may suggest that employees 662 ask a virtual agent a question when some or all human agents are occupied (a virtual agent is an automated entity that uses natural language processing to answer questions). Alternatively or additionally, the recommendation engine may suggest that an employee view online content that is related to other content that the employee is viewing or has searched. This online content may include knowledgebase articles, videos, and so on.

IT administrators 664 may be individuals who are responsible for the proper configuration of enterprise ITSM. Thus, the recommendation engine may focus on making proactive and preventative recommendations to IT administrators 664. These may include notifications of misconfigurations detected in devices or services (e.g., the device is using an out of date operating system patch level or version of a software package, or a service is registering an unusually high number of errors), as well as suggestions to deploy new features. For the latter, the remote network management platform may offer a suite of applications and/or features that can be deployed to computational instances. As individual IT administrators might not be aware of all applications and/or features supplied by the suite, the recommendation engine may suggest relevant applications and features. For example, if an IT administrator is a frequent user of service mapping and the enterprise uses public cloud-based services (e.g., AMAZON® AWS®), the recommendation engine may suggest deploying a version of service mapping that supports public-cloud based discovery and service mapping.

Support agents 666 may be individuals who address user concerns by way of a CSM platform application. Thus, support agents 666 may utilize phone calls, video chat, instant messaging, email, and other tools to communicate with users. Frequently, support agents 666 are faced with a problem that a user is experiencing, and seek out a solution in databases of similar problems that have been addressed in the past. Thus, when such a support agent is viewing a problem description from a user, the recommendation engine may provide recommendations regarding similar incidents, problems, and solutions. Particularly, the recommendation engine may suggest that a support agent use a virtual agent to address clustered (e.g., similar) incidents with similar descriptions. Alternatively or additionally, the recommendation engine may suggest similar items in a service catalog when the user is seeking to upgrade a device or a software package.

IT managers 668 may be individuals who are in charge of the overall operation and service efficacy of an enterprise IT system. Thus, IT managers 668 may be focused on IT personnel are carrying out the right tasks in an efficient fashion. The recommendation engine may make process and/or personnel oriented improvement suggestions to IT managers 668. In some cases, platform applications and/or features provided by the remote network management platform may be premium, in that the enterprise would need to specifically purchase them. When one or more premium platform applications and/or features could potentially enhance the enterprise IT system, the recommendation engine may suggest purchase and deployment thereof. As an example, discovery patterns for certain database systems may be premium features. If the standard platform discovery feature determines that such a database system is present in an enterprise, it may recommend the corresponding premium discovery feature. Alternatively or additionally, the recommendation engine may determine that a KPI value, such a mean time to resolution (MTTR), for a particular incident or group of support agents is above a predetermined threshold (e.g., 48 hours). Accordingly, the recommendation engine may notify an IT manager of this anomaly.

In general, the recommendation engine applies rules or ML models to suggest to a particular persona that they look into a phenomenon that the recommendation engine has observed or that they make a change to operations. As described above, these recommendations may be contextually tailored for the recipient persona. The types of recommendation may include product recommendations (e.g., products for the recipient persona to consider deploying or purchasing), content recommendations (e.g., similar articles, incidents, solutions, etc.), corrective recommendations (e.g., notifications that an IT configuration should be modified or fixed), preventative recommendations (e.g., suggestion to update to an operating system patch level that fixes known defects therein), and forecasting-based recommendations (e.g., warnings that storage space is below a threshold level).

VII. Example Rule-Based Recommendations

Figure 7:
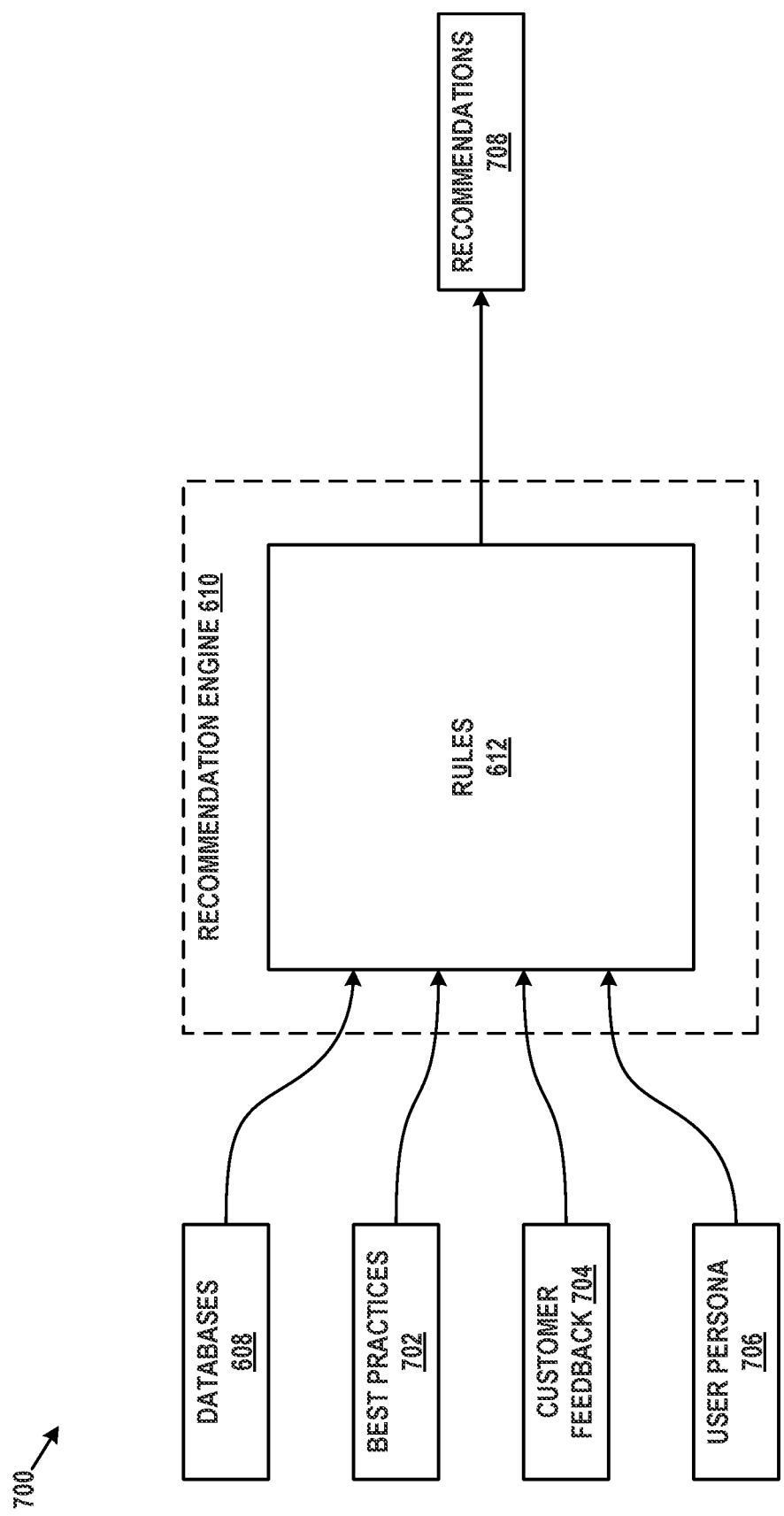
FIG. 7 depicts the input and output of a recommendation engine, in accordance with example embodiments.

FIG. 7 depicts logical arrangement 700 depicting how rules 612 are generated. As noted previously, rules 612 are contained within or accessible to recommendation engine 610. Rules may be based on any combination of information from database 608, best practices 702, customer feedback 704, and user persona 706. Logical arrangement 700 assumes that rules 612 are tailored for just one specific platform application, but similar arrangements can be used for other platform applications. In some embodiments, each of rules 612 may be represented in some form of Boolean logic.

For example, such a rule may take the form of "if (A and (B or C)) then make recommendation D". In this case, A might represent a value in database exceeding a threshold, B might represent a particular type of user persona, and C might represent another particular type of user persona. D might represent a recommendation to examine a possible root cause of the value exceeding the threshold. Clearly, more complicated relationships and scenarios can be developed.

Databases 608 were described above. Notably, these one or more databases may include specific tables used by or relevant to the specific platform application. Information from these tables may be used to develop rules 612. Best practices 702 may be a set of observations and solutions developed over time by a customer service organization, for example. They may take the form of guidelines and/or may be incorporated into rules 612. Customer feedback 704 may be used by CSM support agents, for example, to develop customer-specific or customer-spanning rules. User persona 706 may represent an organizational role of a user. Many recommendations are contextualized for a particular type of user persona so that these recommendations are more relevant to that user's role.

As an example, a best practice for solving the problem of a word processing application not being able to open a certain type of file might be to use an online tool to convert the file to a supported format. Thus, the rule might detect when an employee or support agent persona has entered search terms including the name of the word processing application and the file type, and in response recommend a knowledgeable article that describes how to convert the file.

In another example, a rule may detect when a customer satisfaction (CSAT) metric for a support agent or support agent group is below a threshold. The rule might provide a recommendation to an IT manager persona that this individual or group watch a series of training videos.

VIII. Example ML-Based Recommendations

Embodiments of ML-based recommendations, such as those provided by ML models 616 of recommendation engine 610, may utilize the similarity and/or clustering techniques described below. But ML-based recommendations are not limited to these techniques, and other techniques may be used.

In many situations, the recommendations are made from processing textual records, such as incidents, problems, cases, knowledgebase articles and so on, and the embodiments below assume such textual records for purposes of illustration. Nonetheless, other types of data may be used as the basis for developing and using ML models 616.

A. Similarity

The degree of similarity between two samples of text can be determined in a variety of ways. The two samples of text could be a text field of an incident report and a text field of another incident report, a text field of a resolved incident report, a knowledgebase article, or some other sample of text that may be relevant to the resolution, classification, or other aspects of an incident report. Additionally or alternatively, one or both of the samples could be segments of text within a larger sample of text. A degree of overlap between the identities of words present in the two samples of text and/or a word matrix method could be used to determine the degree of similarity. Additionally or alternatively, one or more techniques of natural language processing could be applied to compare the samples of text such that the context or other semantic content of the texts affects the determined similarity value between the samples of text.

Such techniques may be applied to improve text query matching related to incident reports. These techniques may include a variety of ML algorithms that can be trained based on samples of text. The samples of text used for training can include past examples of incident reports, knowledgebase articles, or other text samples of the same nature as the text samples to which the trained model will be applied. This has the benefit of providing a model that has been uniquely adapted to the vocabulary, topics, and idiomatic word use common in its intended application.

Such techniques can include determining word and/or paragraph vectors from samples of text, applying artificial neural networks (ANNs) or other deep learning algorithms, performing sentiment analysis, or other techniques in order to determine a similarity between samples of text, to group multiple samples of text together according to topic or content, to partition a sample of text into discrete internally-related segments, to determine statistical associations between words, or to perform some other language processing task. Below, a particular method for determining similarity values between samples of text using an ANN model that provides compact semantic representations of words and text strings is provided as a non-limiting example of such techniques. However, other techniques may be applied to generate similarity values between samples of text as applied elsewhere herein. In the discussion below, word vectors and paragraph vectors are two approaches for training an ANN model to represent the sematic meanings of words. These techniques may be combined with one another or with other techniques.

1. Word Vectors

A "word vector" may be determined for each word present in a corpus of text records such that words having similar meanings (or "semantic content") are associated with word vectors that are near each other within a semantically encoded vector space. Such vectors may have dozens, hundreds, or more elements and thus may be an n-space where n is a number of dimensions. These word vectors allow the underlying meaning of words to be compared or otherwise operated on by a computing device. Accordingly, the use of word vectors may allow for a significant improvement over simpler word list or word matrix methods.

Word vectors can be used to quickly and efficiently compare the overall semantic content of samples of text, allowing a similarity value between the samples of text to be determined. This can include determining a distance, a cosine similarity, or some other measure of similarity between the word vectors of the words in each of the text samples. For example, a mean of the word vectors in each of the text samples could be determined and a cosine similarity between the means then used as a measure of similarity between the text samples. Additionally or alternatively, the word vectors may be provided as input to an ANN, a support vector machine, a decision tree, or some other machine learning algorithm in order to perform sentiment analysis, to classify or cluster samples of text, to determine a level of similarity between samples of text, or to perform some other language processing task.

Word vectors may be determined for a set of words in a variety of ways. In an example, a matrix of the word vectors can be an input layer of an ANN. The ANN (including the matrix of word vectors) can then be trained with a large number of text strings from a database to determine the contextual relationships between words appearing in these text strings.

Algebraic vector operations can be used on word vectors Thus, subtracting the vector representation of "mail" from the vector representation of "email" is expected to produce a vector with values close to 0. However, subtracting the vector representation of "VPN" from the vector representation of "email" is expected to produce a vector with higher values. In this manner, the model indicates that "email" and "mail" have closer meanings than "email" and "VPN". Thus, after training, words with similar meanings can map to a similar position in the vector space. For example, the vectors for "powerful" and "strong" may appear close to each other, whereas the vectors for "gerbil" and "hypotenuse" may be farther apart. Additions and subtractions between word vectors also carry meaning. Using vector algebra on the determined word vectors, analogy questions, such as "King"–"man"+"woman"="Queen", can be answered.

Once vector representations have been determined for all words of interest, linear and/or multiplicative aggregations of these vectors may be used to represent text strings. For instance, a vector for a text string can be found by adding together the individual vectors for the words contained therein. In some cases, an average or some other operation may be applied to the vectors for the words. This can be expressed below as the vector sum of m vectors vi with each entry therein divided by m, where i={1 . . . m}. But other possibilities, such as weighted averages, exist.

$$v_{avg} = \frac{1}{m}\sum_{i=1}^{m} v_i \qquad (1)$$

In general, the closer that the vector difference (e.g., a sum of squared distances over each of the n dimensions) between two word vectors is to 0, the greater the similarity of the words they represent. Such a comparison may identify one or more text string vectors from databases 608 or another source that "match" in this fashion. In some cases, this may be the k text string vectors with the highest similarity, or any text string vector with a similarity that is greater than a pre-determined value.

2. Paragraph Vectors

Despite the usefulness of word vectors, the complete semantic meaning of a sentence or other passage (e.g., a phrase, several sentences, a paragraph, a text segment within a larger sample of text, or a document) cannot always be captured from the individual word vectors of a sentence (e.g., by applying vector algebra). Word vectors can represent the semantic content of individual words and may be trained using short context windows. Thus, the semantic content of word order and any information outside the short context window is lost when operating based only on word vectors.

Take for example the sentence "I want a big green cell right now." In this case, simple vector algebra of the individual words may fail to provide the correct semantic meaning of the word "cell," as the word "cell" has multiple possible meanings and thus can be ambiguous. Depending on the context, "cell" could be a biological cell, a prison cell, or a cell of a cellular communications network. Accordingly, the paragraph, sentence, or phrase from which a given word is sampled can provide crucial contextual information.

In another example, given the sentence "Where art thou _____," it is easy to predict the missing word as "Romeo" if sentence was said to derive from a paragraph about Shakespeare. Thus, learning a semantic vector representation of an entire paragraph can help contribute to predicting the context of words sampled from that paragraph.

Similar to the methods above for learning word vectors, an ANN or other machine learning structures may be trained using a large number of paragraphs in a corpus to determine the contextual meaning of entire paragraphs, sentences, phrases, or other multi-word text samples as well as to determine the meaning of the individual words that make up the paragraphs in the corpus. For example, for each paragraph in a corpus, an ANN can be trained with fixed-length contexts generated from moving a sliding window over the paragraph. Thus, a given paragraph vector is shared across all training contexts created from its source paragraph, but not across training contexts created from other paragraphs. Word vectors are shared across training contexts created from all paragraphs, e.g., the n-space vector for each word is the same for all paragraphs. Paragraphs are not limited in size; they can be as large as entire documents or as small as a sentence or phrase.

Once vector representations have been determined for paragraphs in the corpus, linear and/or multiplicative aggregation of these vectors may be used to represent topics of interest. Furthermore, if the dimensions of paragraph vectors are the same as the dimensions of word vectors, then linear and multiplicative aggregation between word vectors and paragraphs vectors can be obtained. For example, finding the Chinese equivalent of "Julius Caesar" using an encyclopedia as a corpus can be achieved by vector operations PV("Julius Caesar")−WV("Roman")+WV("Chinese"), where PV is a paragraph vector (representing an entire article) and WV are word vectors. Thus, paragraph vectors can achieve the same kind of analogies to word vectors with more context-based results.

In practice, such learned paragraph vectors can be used as inputs into other supervised learning models, such as sentiment prediction models. In such models, which can include but are not limited to ANNs, paragraph vectors are used as input with a corresponding sentiment label as output. Other metrics such as cosine similarity and nearest neighbor clustering algorithms can be applied to paragraph vectors to find or group paragraphs on similar topics within the corpus of paragraphs.

B. Clustering

Queries, incident reports, knowledgebase articles, and/or other textual or non-textual records can be clustered together. Such clustering may be performed to provide a variety of benefits. For example, clustering may be applied to a set of records in order to identify patterns or groups within the set of records that have relevance to the operation of a system or organization. Such groups may facilitate the tracking of ongoing problems (e.g., network outages, user confusion interfacing with a network-based service) by measuring a time-dependence of records assigned to a particular cluster associated with the ongoing problem(s). Such groups may facilitate the early identification of newly-emerging problems by, e.g., identifying similarities between newly-received reports. In some examples, clustering may allow similar reports (e.g., reports corresponding to the same cluster(s)) to be manipulated in common, in order to reduce the time required to respond to sets of similar reports. For example, reports that are related to a network outage and that are assigned to a single cluster could all be resolved in a single operation following resolution of the network outage.

In some examples, clustering may facilitate the allocation of reports to technicians according to specialty, familiarity, or other factors. Additionally or alternatively, a knowledgebase article, solution flowchart, or other material could be created for each identified cluster in order to facilitate resolution of reports as they are assigned to the clusters. Identifying clusters within a set of queries, incident reports, or other textual or non-textual records can provide additional or alternative benefits.

Incident reports, queries, knowledgebase articles, or types of records that may include textual elements and/or non-textual elements can be grouped into clusters in a variety of ways. Such clustering may be performed in a supervised manner in order to generate a clustering algorithm that assigns novel records into clusters according to a manually-classified set of training records. Additionally or alternatively, clustering may be performed in an unsupervised manner in order to generate clusters without the requirement of manually-labeled records, to identify previously un-identified clusters within the training data, or to provide some other benefit.

A variety of methods and/or ML algorithms could be applied to identify clusters within a set of records and/or to assign records (e.g., newly received or generated records) to already-identified clusters. For example, decision trees, ANNs, k-means, support vector machines, independent component analysis, principal component analysis, or some other method could be trained based on a set of available records in order to generate an ML model to classify the available records and/or to classify records not present in the training set of available records. The inputs to such an ML model could include a variety of features of the records. Such features could be present in the records (e.g., dates and times, status flags, user IDs) and/or determined from information already present in the records (e.g., word vectors, paragraph vectors). The input features could include dates and times or other numerical information related to the records. The input features could include categorical information like user ID numbers or status flags (e.g., 'open,' 'closed-resolved,' 'closed-unresolved'). The input features could include information related to textual information (e.g., a 'problem description' field) of the records. For example, the input features could be related to word and/or paragraph vectors generated from textual fields of the records and/or other features generated using natural language processing. The input features could be subjected to a mapping (e.g., a nonlinear transformation, a dimensionality reduction) prior to being applied to the ML model.

For example, each record in a corpus may be represented by a respective location within a two-dimensional space. The location of a given record within the space could be related to the value of two features of the given record (e.g., a time of generation of the record and a time of resolution of the record, two dimensions of a paragraph vector generated from text of the record). Alternatively, the location of a given record could be related to a projection of more than two features of the record into the two-dimensional space using a linear or nonlinear dimensionality reduction technique or some other mapping method.

Similarity values can be determined for pairs of records in corpus. Such similarity values could be used to generate an ML model to cluster the records such that the records that are 'similar' in some sense are assigned to the same cluster, while records that are very 'dissimilar' are assigned to different clusters. Such a similarity value could correspond to a distance measure between the records in some space, e.g., the two-dimensional space described above, a semantically-encoded vector space related to word and/or paragraph vectors determined from textual aspects of the records, a vector space that includes dimensions relating to the time of generation of the record or other numerical and/or categorical information of the record, etc. Such a distance could be a Euclidean distance, a Manhattan distance, or some other distance measure according to the properties of a platform application.

As noted above, a variety of methods could be used to generate an ML model that assigns records to two or more clusters and/or that assigns records to a set of residual, un-assigned records. Once the ML model has been determined, the ML model can be applied to assign additional records to the identified clusters represented by the ML model and/or to assign records to a set of residual records. The ML model could include parameter values, neural network hyperparameters, cluster centroid locations in feature space, cluster boundary locations in feature space, threshold similarity values, or other information used, by the ML model, to determine which cluster to assign a record and/or to determine that the record should not be assigned to a cluster (e.g., should be stored in a set of residual, un-assigned records). Such information could define a region, within a feature space, that corresponds to each cluster. That is, the information in the ML model could be such that the ML model assigns a record to a particular cluster if the features of the record correspond to a location, within the feature space, that is inside the defined region for the particular cluster. The defined regions could be closed (being fully enclosed by a boundary) or open (having one or more boundaries but extending infinitely outward in one or more directions in the feature space).

In some examples, the ML model could include centroids or other location information indicative of the location, within a feature space, of the clusters. A centroid could be a location of an arithmetic or geometric mean of the locations of records in the cluster, a determined geometric center or other defining location of a hypersphere, hyperellipsoid, or other shape fitted to the records of the cluster, or some other location related to the overall location and/or extent of the cluster in a feature space. In such examples, a record could be assigned to a particular cluster when the location of the record, in the feature space, is closer to the centroid of the particular cluster than it is to the centroid of any other cluster. An ML model organized in such a manner could include a k-means classifier.

In some examples, a record could be precluded from assignment to a particular cluster unless a degree of similarity between the cluster and the record is greater than a threshold similarity. This could include a distance between the location of the record and a centroid or other characteristic location of the cluster being less than a threshold distance. Records that are precluded from inclusion in any cluster could be added to a set of residual records.

In some examples, the ML model could operate in a specified order to determine whether a record should be assigned to each cluster. For example, the ML model could first determine whether a record should be assigned to a first cluster (e.g., by comparing a distance between a centroid of the first cluster and a location of the record to a threshold distance). If it is determined that the record should not be assigned to the first record, the ML model could operate to determine whether the record should be assigned to a second cluster, and so on. Such a method could have the benefit of reducing the expected computational cost of assigning a record to a cluster (or determining that the record should not be assigned to any cluster). Additionally or alternatively, such a method could allow additional clusters to be added to the model without re-assigning any regions of the feature space to the new cluster that had formerly been associated with any of the pre-existing clusters. This could be done by placing the newly added cluster(s) to the end of the sequence for determining whether the record should be assigned to any of the clusters.

C. Using Recommendations

Figure 8:
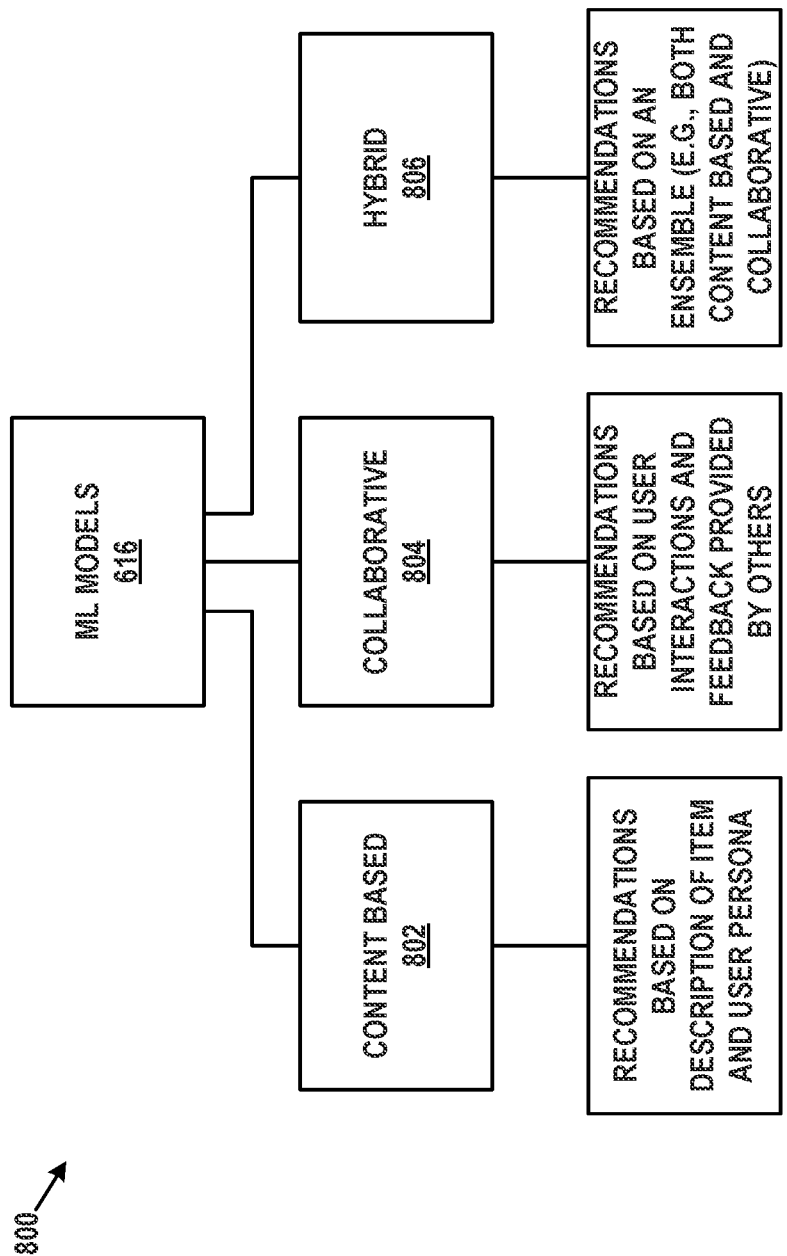
FIG. 8 depicts various types of ML models, in accordance with example embodiments.

ML-based recommendations, whether based on similarity, clustering, or some combination thereof, may be used by the recommendation engine in various ways. FIG. 8 illustrates a possible configuration 800 of the recommendation engine. In configuration 800, ML models 616 have three types—content based 802, collaborative 804, and hybrid 806.

Content based 802 ML models may make recommendations based on descriptions of items. For example, when a user enters a textual query to search a knowledgebase, the aforementioned similarity and/or clustering techniques may be used to find articles with content similar to that of the query. Alternatively, when the user is presented with an article, a list of similar articles may be provided as well. The user's persona may also be taken into account, e.g., to give a higher ranking to similar articles that are targeted toward that persona.

Collaborative 804 ML models may make recommendations based on user interactions and feedback provided by other users. In one example, suppose that two users are deemed to be similar (e.g., they have the same persona, or their search queries or articles read are similar). Then, if one user reads an article, the recommendation engine might suggest that article to the other user. In these or additional examples, the knowledgebase may also include user-provided ratings (e.g., thumbs up or thumbs down, a scale of 1 to 5, etc.) for at least some articles. The recommendation engine may give preference to higher-ranked articles over lower-ranked articles when providing results to search queries, for example.

Hybrid 806 ML model may be a combination of content based 802 and collaborative 804 ML models. Thus, the recommendation engine may take into account both similarity metrics and user rankings when providing search results or lists of similar articles. The weights given to the similarity metrics and user rankings in this model may be fixed or user configurable. An as example, twice as much weight might be given to similarity as is given to user rankings, which would mean that search results would prefer high similarity articles with low rankings over low similarity articles with high rankings.

As a further example, suppose that a user is searching for a particular model of a mobile phone in a service catalog (e.g., a list of IT-related products that the user can procure). This model of the phone may be provided in the search results, but the recommendation engine may also provide similar models (e.g., the previous and next generation of the search-for model) as well as compatible charging cables, and related knowledgebase articles about how to configure the mobile phone for operation within the user's enterprise.

IX. Specific Recommendation Use Cases

Figure 9A:
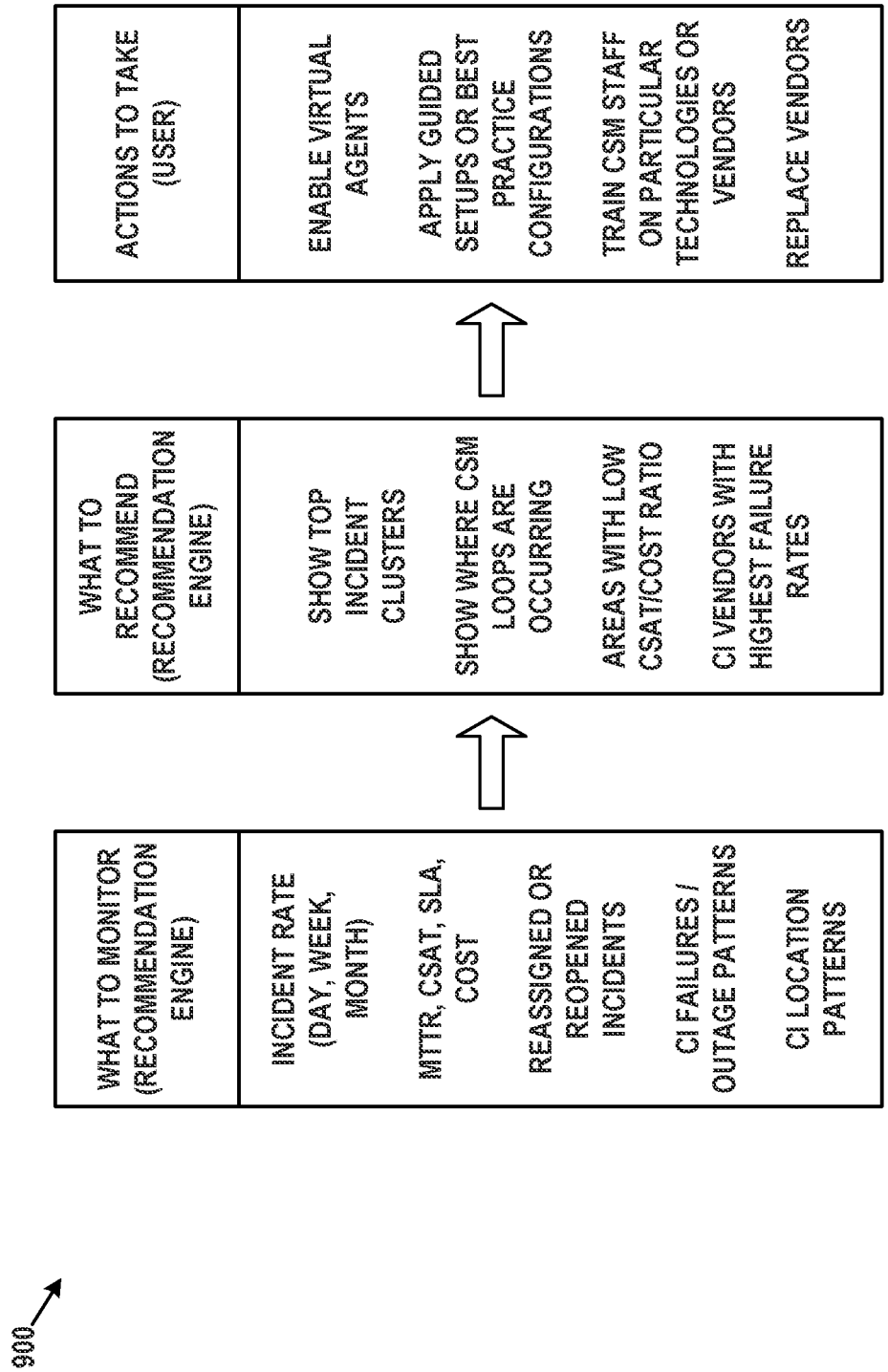
FIGS. 9A, 9B, and 9C depict specific examples of recommendations, in accordance with example embodiments.
Figure 9B:
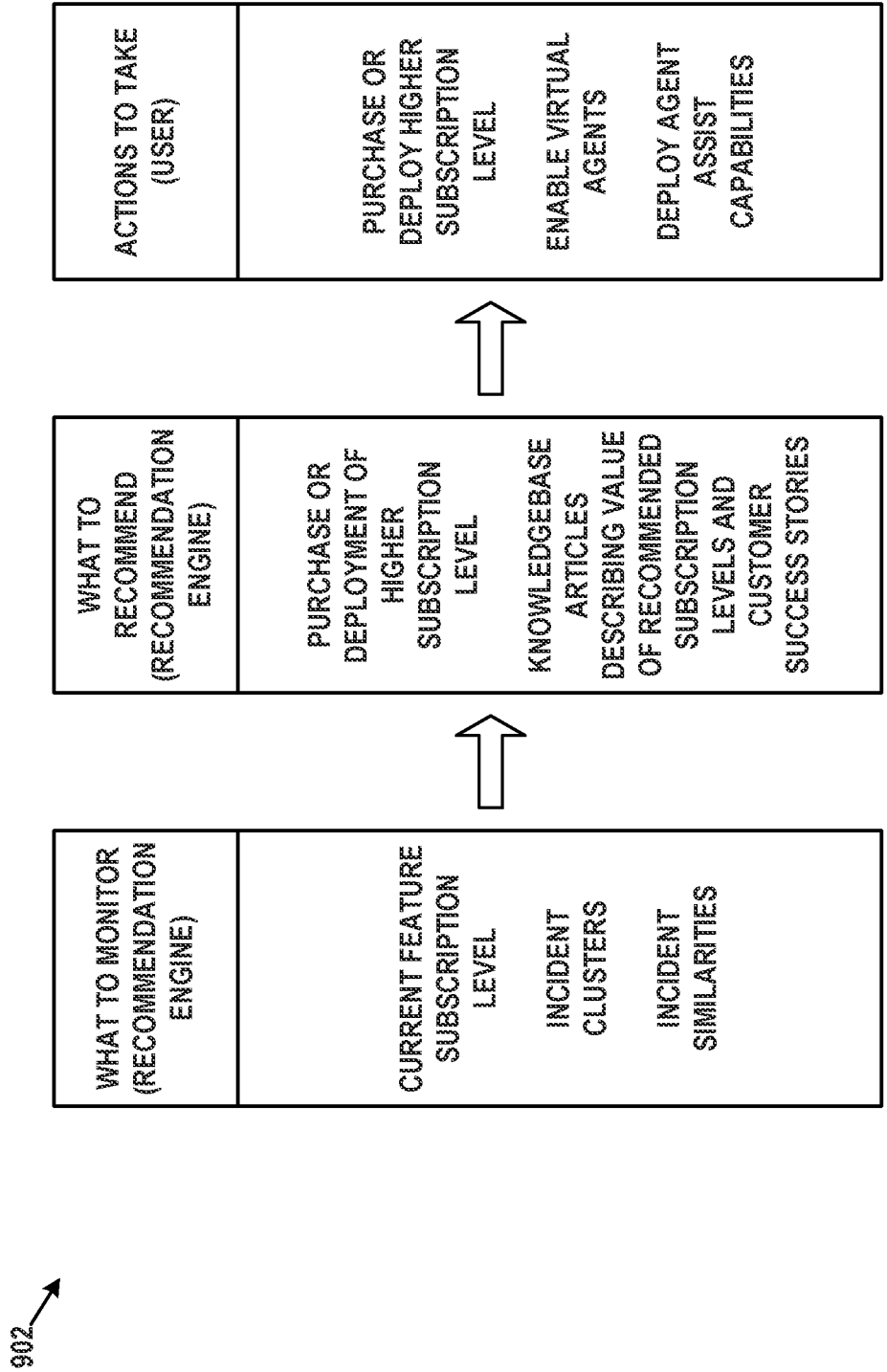
Figure 9C:
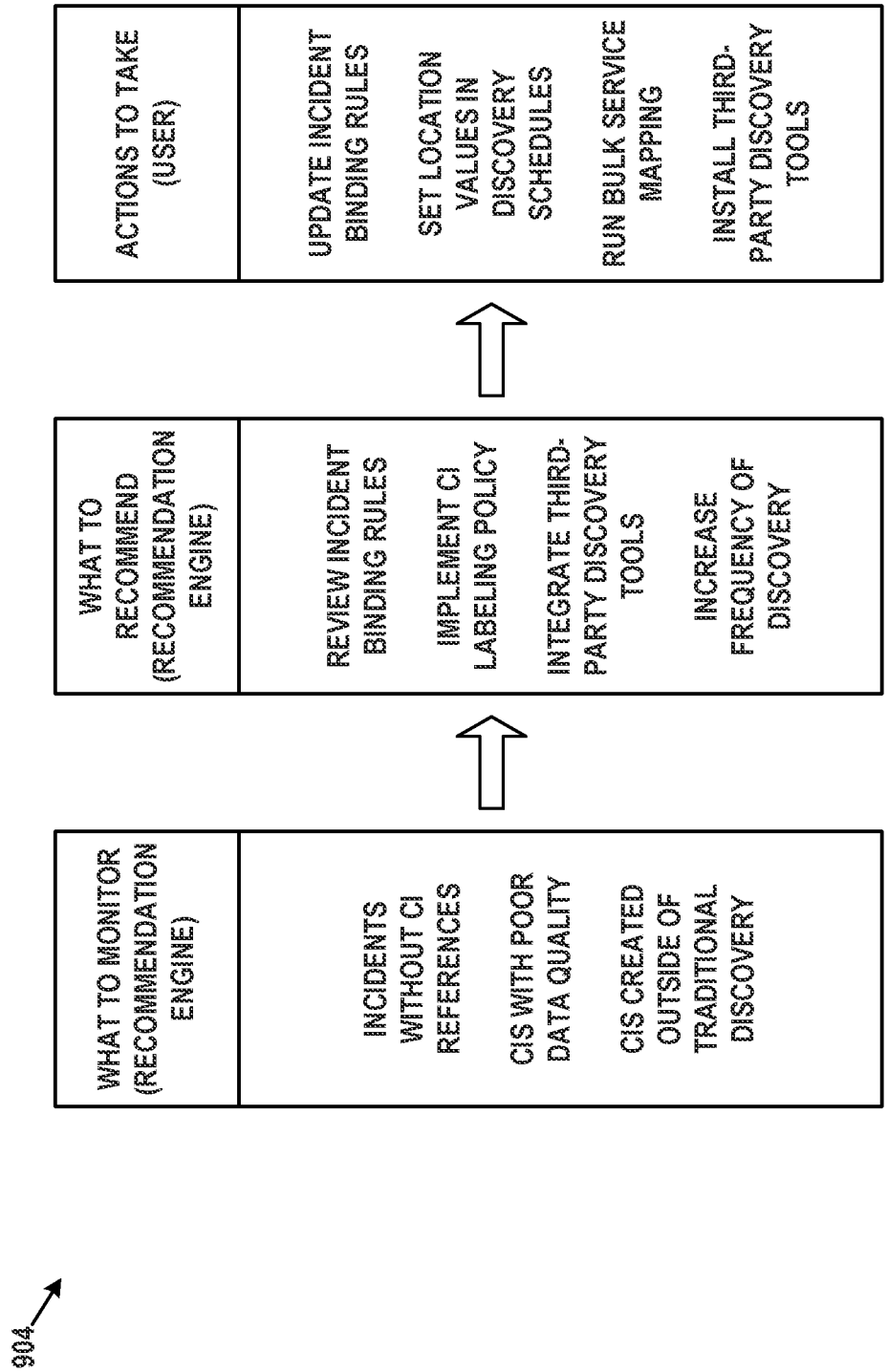

FIGS. 9A, 9B, and 9C provide example use cases for the recommendation engine and the supporting architecture described herein. Each of these use cases is just for purpose of illustration and other use cases are possible. Further, each use case is arranged in three sections—what to monitor, what to recommend, and actions to take. The first two of these sections are generally carried out by the recommendation engine while the third section is generally carried out by a user.

FIG. 9A depicts a use case 900 for improving incident processing. This use case may be employed for ITSM and/or CSM platform applications. In use case 900, the recommendation engine monitors one or more of: (i) incident rates (e.g., daily, weekly, and/or month) for trends and outliers, (ii) MTTR, customer satisfaction (CSAT), service level agreement (SLA) compliance, and cost metrics, (iii) cases reassigned or reopened at an unusually high rate, (iv) configuration item failure and/or outage patterns thereof, and (v) configuration item location patterns.

Based on this monitored data, the recommendation engine may (depending on user persona) do one or more of: (i) showing top incident clusters, (ii) showing where CSM loops are occurring (CSM loops are cases that are repeatedly get assigned to the same agents or are repeatedly placed in the same state), (iii) identifying areas with low CSAT/cost ratios (e.g., customers are relatively unhappy in view of the high cost of providing the service), and (iv) identifying configuration item (e.g., hardware or software) vendors with the highest failure rates.

In response to the recommendations, the user may then take one or more of the following actions: (i) enabling virtual agents to offload busy human support agents, (ii) applying guided setups or best practice configurations for certain configuration items, (iii) training CSM staff on particular technologies or vendors where CSM staff is underperforming, and (iv) replacing vendors with high failure rates.

FIG. 9B depicts a use case 902 for improving deployment of remote network management platform features. This use case may be employed for ITSM and/or ITOM platform applications. In use case 902, the recommendation engine monitors one or more of: (i) current feature subscription levels, (ii) incident clusters, and (iii) incident similarities. The recommendation engine may determine, for example, that a higher subscription level may provide features that would help address the identified incident clusters.

Based on this monitored data, the recommendation engine may (depending on user persona) recommend one or more of: (i) purchasing or deployment of a higher subscription level, and (ii) knowledgebase articles that describe the value of the recommended subscription levels and customer success stories related thereto.

In response to the recommendations, the user may then take one or more of the following actions: (i) purchasing and deploying the higher subscription level, (ii) enabling virtual agents to handle incidents with high similarities to other incidents or that clearly fall into one of the clusters, and (iii) deploying agent assist capabilities (e.g., automatic display of similar search results).

FIG. 9C depicts a use case 904 for improving IT operations management. This use case may be employed for ITOM platform applications. In use case 904, the recommendation engine monitors one or more of: (i) incidents without configuration item references, (ii) configuration items with poor data quality (e.g., many blank fields), and (iii) configuration items created outside of normal discovery (e.g., received by way of a third-party tool).

Based on this monitored data, the recommendation engine may (depending on user persona) recommend one or more of: (i) reviewing of incident/configuration item binding rules, and (ii) implementing of a configuration item labeling policy, (iii) recommending integration of third-party discovery tools, and (iv) increase of the frequency of discovery.

In response to the recommendations, the user may then take one or more of the following actions: (i) updating incident binding rules, (ii) setting location values in discovery schedules, (iii) running bulk service mapping, and (iv) installing adaptors for third-party discovery tools that facilitate CMDB consistency.

Notably, the user cases 900, 902, and 904 are merely for purpose of example. Other data to monitor, additional recommendations and further user actions may be possible.

X. Example Operations

Figure 10:
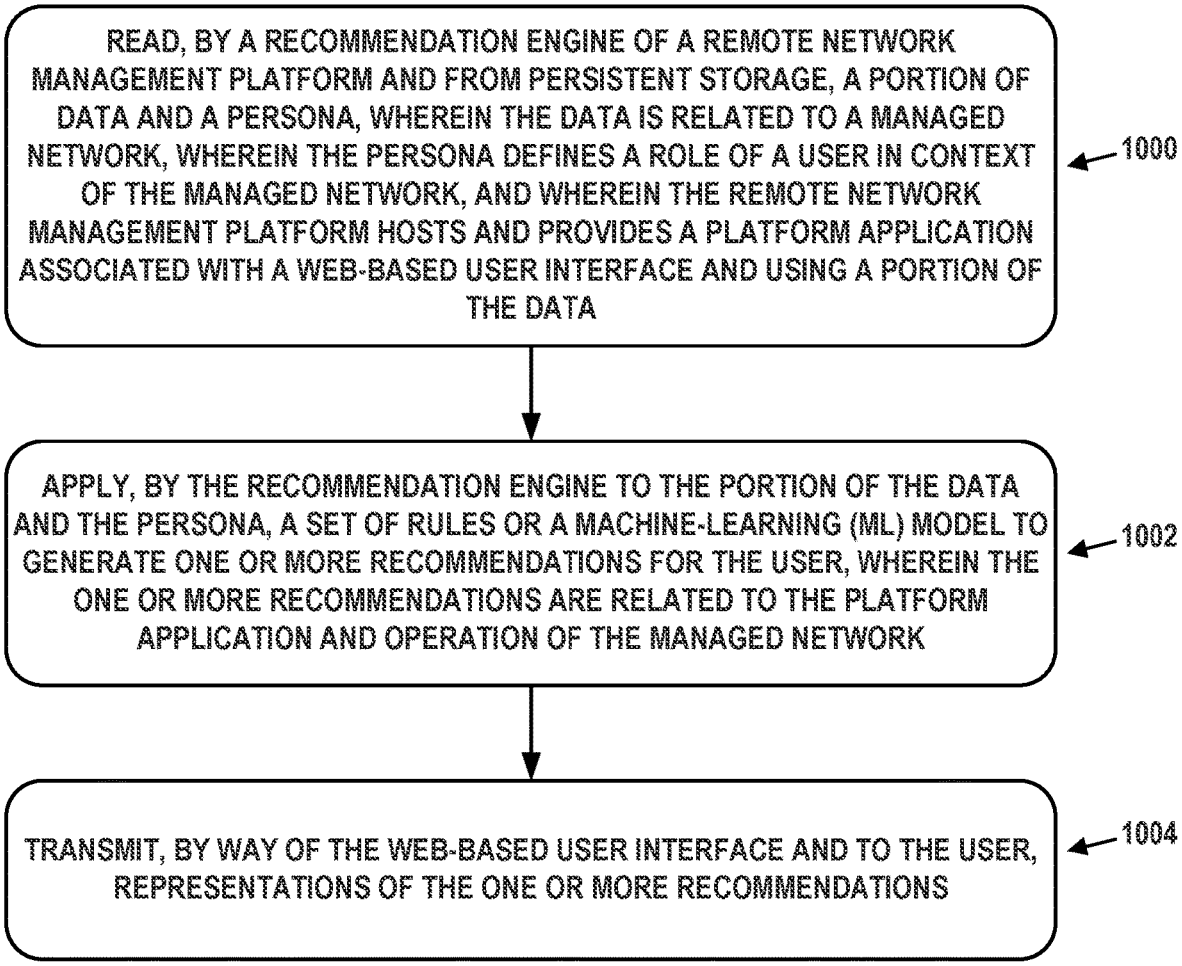
FIG. 10 is a flow chart, in accordance with example embodiments.

FIG. 10 is a flow chart illustrating an example embodiment. The process illustrated by FIG. 10 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 10 may be simplified by the removal of any one or more of the features shown therein. Further, these embodiments may be combined with features, aspects, and/or implementations of any of the previous figures or otherwise described herein.

Block 1000 may involve reading, by a recommendation engine of a remote network management platform and from persistent storage, a portion of data and a persona, where the data is related to a managed network, where the persona defines a role of a user in context of the managed network, and where the remote network management platform hosts and provides a platform application associated with a web-based user interface and using a portion of the data.

Block 1002 may involve applying, by the recommendation engine to the portion of the data and the persona, a set of rules or a machine learning (ML) model to generate one or more recommendations for the user, where the one or more recommendations are related to the platform application and operation of the managed network.

Block 1004 may involve transmitting, by way of the web-based user interface and to the user, representations of the one or more recommendations.

In some embodiments, the recommendation engine is further configured to: (i) receive, by way of the web-based user interface, a request for a web page; and (ii) generate the web page to include the representations of the one or more recommendations encoded therein, where applying the set of rules or the ML model to generate one or more recommendations for the user occurs in response to receiving the request for the web page.

In some embodiments, the recommendation engine includes a scheduler configured with a pre-defined schedule, where the recommendation engine is further configured to determine that the pre-defined schedule indicates that the one or more recommendations are to be generated, where applying the set of rules or the ML model to generate the one or more recommendations occurs in response to determining that the pre-defined schedule indicates that the one or more recommendations are to be generated.

In some embodiments, the persistent storage also contains a second persona of a second user, where the second persona defines a second role of the second user in context of the managed network. The remote network management platform may further include a second platform application associated with a second web-based user interface and using a second portion of the data. The recommendation engine may also have access to a second set of rules or a second ML model corresponding to the second platform application, where the second set of rules and the second ML model are configured to provide recommendations for the second user based on the second portion of the data and the second persona, and where the recommendation engine is further configured to: (i) read, from the persistent storage, the second portion of the data and the second persona; (ii) apply, to the second portion of the data and the second persona, the second set of rules or the second ML model to generate one or more further recommendations, where the one or more further recommendations are related to the second platform application and operation of the managed network; and (iii) provide, by way of the second web-based user interface and to the second user, representations of the one or more further recommendations.

In some embodiments, a second platform application may be associated with a second web-based user interface and may use a second portion of the data. The recommendation engine may also have access to a second set of rules or a second ML model corresponding to the second platform application. The second set of rules and the second ML model may be configured to provide recommendations for the user based on the second portion of the data and the persona. The recommendation engine may further be configured to: (i) read, from the persistent storage, the second portion of the data and the persona; (ii) apply, to the second portion of the data and the persona, the second set of rules or the second ML model to generate one or more further recommendations, where the one or more further recommendations are related to the second platform application and operation of the managed network; and (iii) provide, by way of the web-based user interface and to the user, representations of the one or more further recommendations. In some cases, the persistent storage includes a database containing the portion of the data in one or more tables and a second database containing the second portion of the data in one or more further tables.

In some embodiments, the set of rules includes conditional Boolean expressions that map specific values in the data and types of user personae to specific recommendations of the one or more recommendations, where applying the set of rules comprises: (i) evaluating the conditional Boolean expressions; and (ii) identifying one or more of the specific recommendations mapped to any of the conditional Boolean expressions that are true.

In some embodiments, the ML model was trained with mappings between: (i) historical values from the portion of the data and types of user personae, and (ii) best-practice recommendations, and where applying the ML model comprises: (i) providing, as input to the ML model, a subset of the portion of the data that was not used to train the ML model; and (ii) obtaining, as output from the ML model, the one or more recommendations.

In some embodiments, the portion of the data includes a corpus of textual documents, where the ML model was trained in an unsupervised fashion to identify similarities between the textual documents, where the similarities are based on representations of the textual documents in an n-dimensional space, and where applying the ML model comprises: (i) providing, as input to the ML model, a further textual document; (ii) mapping, by the ML model, the further textual document to the n-dimensional space; and (iii) obtaining, as output from the ML model and as the one or more recommendations, a subset of textual documents from the corpus, where the subset of textual documents have greater than a threshold similarity to the further textual document.

In some embodiments, the portion of the data includes a corpus of textual documents, where the ML model was trained in an unsupervised fashion to identify clusters of the textual documents, where the clusters are based on representations of the textual documents in an n-dimensional space, and where applying the ML model comprises: (i) providing, as input to the ML model, a further textual document; (ii) mapping, by the ML model, the further textual document to a particular cluster of the clusters; and (iii) obtaining, as output from the ML model and as the one or more recommendations, a subset of textual documents from the corpus, where the subset of textual documents also map to the particular cluster.

In some embodiments, the platform application is an ITSM application, and the one or more recommendations relate to incidents raised by users of the managed network.

In some embodiments, the platform application is an ITOM application, and the one or more recommendations relate to services provided by hardware or software present in the managed network.

In some embodiments, the platform application is a CSM application, and the one or more recommendations relate to requests made by customers of the managed network to human or virtual CSM agents.

In some embodiments, the platform application is a SECOPS application, and the one or more recommendations relate to security vulnerabilities or threats on the managed network.

XI. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A remote network management platform, comprising:
    a processor; and
    a memory, accessible by the processor, the memory storing instructions, that when executed by the processor, cause the processor to perform operations comprising:
        receiving a first set of data associated with a platform application configured to be executed by the remote network management platform with respect to a managed network and a second set of data associated with a persona, wherein the persona defines a role of a user associated with the managed network;
        generating, via a machine learning (ML) model, one or more recommendations associated with the platform application and the persona based on the first set of data and the second set of data; and
        transmitting, to a display device within the managed network, one or more representations indicative of the one or more recommendations.

2. The remote network management platform of claim 1, wherein the one or more recommendations comprise reconfiguring one or more computing devices within the managed network.

3. The remote network management platform of claim 1, wherein the one or more recommendations comprise resolving a resource deficiency associated with one or more computing devices within the managed network.

4. The remote network management platform of claim 1, wherein the one or more recommendations comprise updating or upgrading a software application configured to be executed by one or more computing devices within the managed network.

5. The remote network management platform of claim 1, wherein the operations comprise:
    receiving a third set of data associated with a second persona, wherein the second persona defines a second role of a second user associated with the managed network, wherein the second persona is different from the persona; and
    generating, via the ML model, one or more second recommendations associated with the platform application and the second persona based on the first set of data and the third set of data, wherein the one or more recommendations are different from than the one or more second recommendations.

6. The remote network management platform of claim 1, wherein the operations comprise:
    receiving, from the display device, user input indicative of an action configured to change one or more operations of the managed network; and
    executing the action based on the user input.

7. The remote network management platform of claim 6, wherein the operations comprise:
    receiving, from the display device, user feedback based on execution of the action; and
    re-training the ML model based on the user feedback.

8. A method, comprising:
    generating, by one or more processors associated with a remote network management platform via a machine learning (ML) model, one or more recommendations associated with a platform application configured to be executed by the remote network management platform to support one or more operations of a managed network, wherein the one or more recommendations are automatically generated based on a first set of data associated with the platform application and a second set of data associated with a persona configured to define a user role associated with the managed network;
    transmitting, by the one or more processors to a display device within the managed network, one or more representations indicative of the one or more recommendations;

receiving, by the one or more processors from the display device, user input indicative of an action configured to change the one or more operations of the managed network; and executing, by the one or more processors, the action based on the user input.

9. The method of claim 8, wherein the one or more recommendations comprise reconfiguring one or more computing devices within the managed network.

10. The method of claim 8, wherein the one or more recommendations comprise resolving a resource deficiency associated with one or more computing devices within the managed network.

11. The method of claim 8, wherein the one or more recommendations comprise updating or upgrading a software application configured to be executed by one or more computing devices within the managed network.

12. The method of claim 8, comprising:

receiving a third set of data associated with a second persona, wherein the second persona defines a second role of a second user associated with the managed network, wherein the second persona is different from the persona; and generating, via the ML model, one or more second recommendations associated with the platform application and the second persona based on the first set of data and the third set of data, wherein the one or more recommendations are different from than the one or more second recommendations.

13. The method of claim 8, comprising:

receiving, from the display device, user feedback based on execution of the action; and re-training the ML model based on the user feedback.

14. The method of claim 8, comprising training the ML model with one or more mappings between historical values within data associated with the managed network and one or more types of personae associated with the managed network.

15. A non-transitory, computer-readable medium, comprising instructions that when executed by one or more processors, cause the one or more processors to perform operations comprising:

receiving a first set of data associated with a platform application configured to be executed by a remote network management platform with respect to a managed network and a second set of data associated with a persona, wherein the persona defines a role of a user associated with the managed network;

automatically generating, via a machine learning (ML) model, one or more recommendations associated with the platform application and the persona based on the first set of data and the second set of data;

transmitting, to a display device within the managed network, one or more representations indicative of the one or more recommendations;

receiving, from the display device, user input indicative of an action configured to change one or more operations of the managed network; and executing the action based on the user input.

16. The non-transitory, computer-readable medium of claim 15, wherein the one or more recommendations comprise reconfiguring one or more computing devices within the managed network.

17. The non-transitory, computer-readable medium of claim 15, wherein the one or more recommendations comprise resolving a resource deficiency associated with one or more computing devices within the managed network.

18. The non-transitory, computer-readable medium of claim 15, wherein the operations comprise:

receiving a third set of data associated with a second persona, wherein the second persona defines a second role of a second user associated with the managed network, wherein the second persona is different from the persona; and generating, via the ML model, one or more second recommendations associated with the platform application and the second persona based on the first set of data and the third set of data, wherein the one or more recommendations are different from than the one or more second recommendations.

19. The non-transitory, computer-readable medium of claim 15, wherein the operations comprise:

receiving, from the display device, user feedback based on execution of the action; and re-training the ML model based on the user feedback.

20. The non-transitory, computer-readable medium of claim 15, wherein the operations comprise training the ML model with one or more mappings between historical values within data associated with the managed network and one or more types of personae associated with the managed network.

* * * * *